(12) United States Patent
Snyder

(10) Patent No.: US 9,984,783 B2
(45) Date of Patent: May 29, 2018

(54) ENERGY EFFICIENT METHOD OF COHERENTLY TRANSMITTING ELECTROMAGNETICALLY NEUTRALIZED RADIATION PRODUCED WITH DESTRUCTIVE INTERFERENCE TO A TARGET

(71) Applicant: Steven Howard Snyder, Southfield, MI (US)

(72) Inventor: Steven Howard Snyder, Southfield, MI (US)

( * ) Notice: Subject to any disclaimer, the term of this patent is extended or adjusted under 35 U.S.C. 154(b) by 0 days. days.

(21) Appl. No.: 13/758,578

(22) Filed: Feb. 4, 2013

(65) Prior Publication Data

US 2013/0146789 A1 Jun. 13, 2013

Related U.S. Application Data

(63) Continuation of application No. 11/309,936, filed on Oct. 31, 2006, now abandoned.

(51) Int. Cl.
*G21K 5/04* (2006.01)
*H04B 10/90* (2013.01)

(52) U.S. Cl.
CPC .............. *G21K 5/04* (2013.01); *H04B 10/90* (2013.01)

(58) Field of Classification Search
CPC .................................. G21K 5/04; H04B 10/90
USPC ..... 250/550, 227.19, 227.17; 356/28.5, 35.5, 356/450, 460, 477; 359/337.22, 577
See application file for complete search history.

(56) References Cited

U.S. PATENT DOCUMENTS 7,554,666 B2 * 6/2009 Russell .................. 356/450
2002/0166960 A1 * 11/2002 Pronko ................ B01D 59/44
250/282

OTHER PUBLICATIONS

In re Nuijten, 84 USPQ2d 1495 (Fed. Cir. 2007).*

* cited by examiner

*Primary Examiner* — Tony Ko

(57) ABSTRACT

Invention provided for efficiently transmitting energy to a target for producing an overall effective result for applications comprising power transmission and communications. Wherein, first, a source of electromagnetically intense coherent radiation and an interferometer produce a beam of electromagnetically neutralized radiation. The neutralized beam comprises forward propagating photons or forward propagating electrically charged particles which have associated forward traveling waves which superimpose and destructively interfere to an extent, and have oscillatorily time-varying electromagnetic fields which cancel to a corresponding extent. Then, second, the electromagnetically neutralized beam is coherently transmitted through transmission apparatus to a target which then, third, utilizes the transmitted beam. Wherein, the adverse electromagnetic interaction of the neutralized beam with electrically charged particles comprised in the transmission apparatus and the adverse electromagnetic effects of transmitting energy are eliminated in direct proportion to the destructive interference in, and the respective intensity eliminated from, the neutralized beam during transmission.

4 Claims, 19 Drawing Sheets

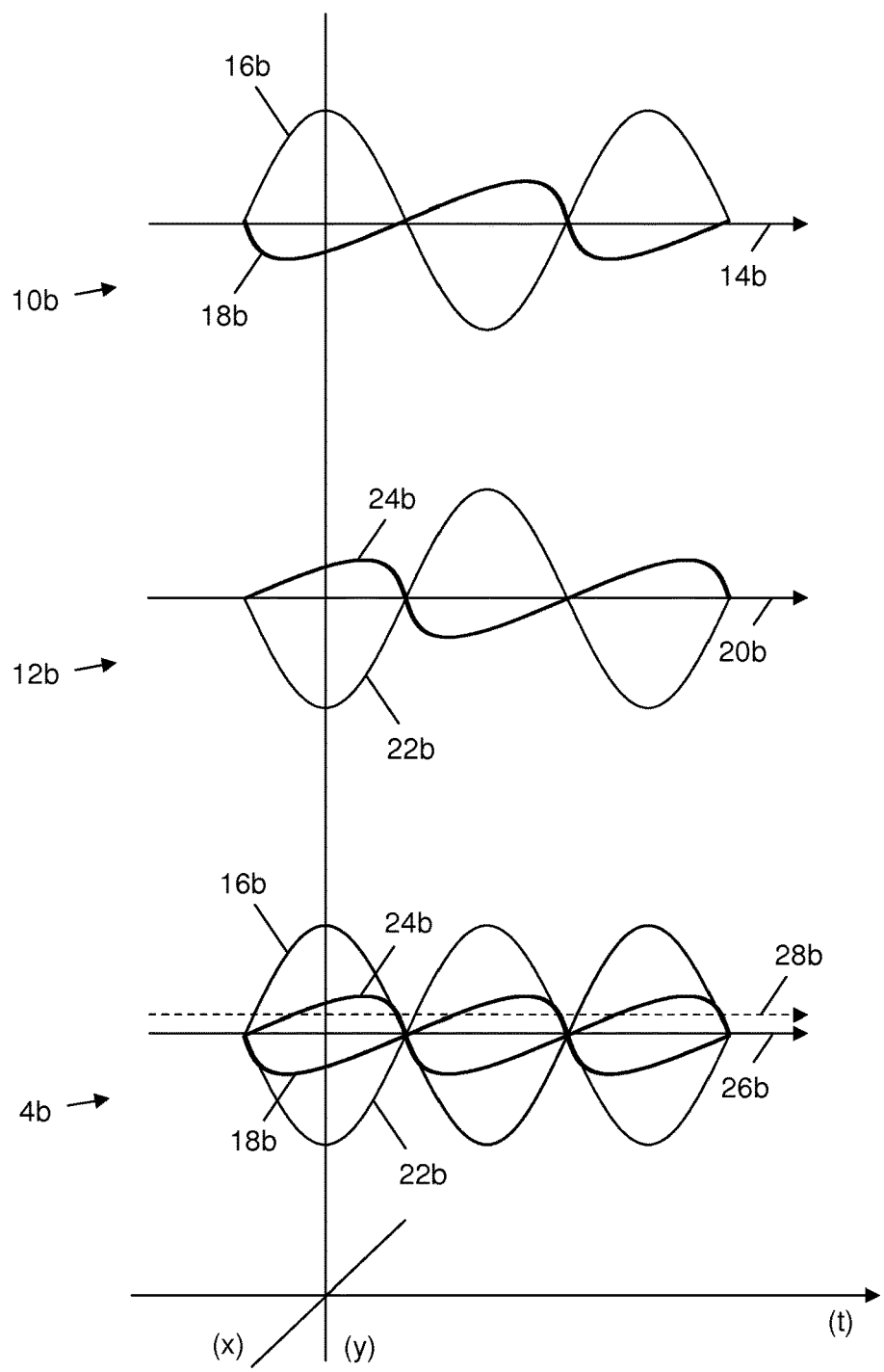
FIG. 2-a

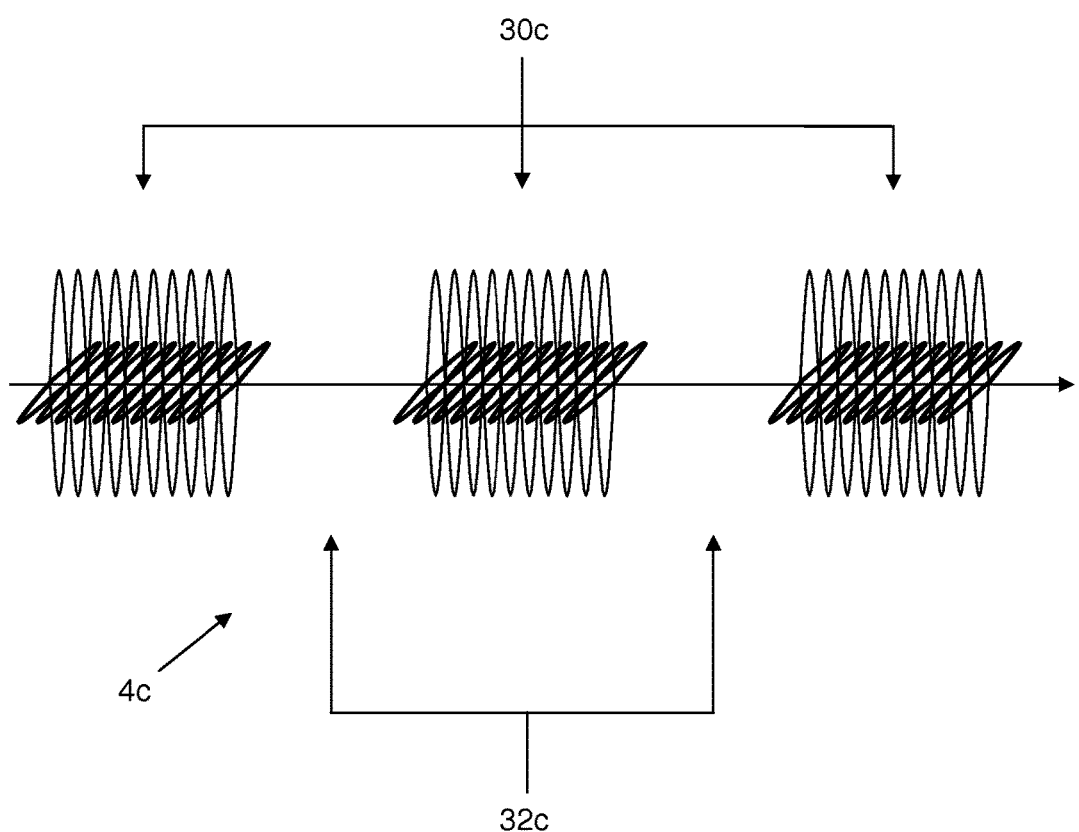
FIG. 2-b

FIG. 2-c

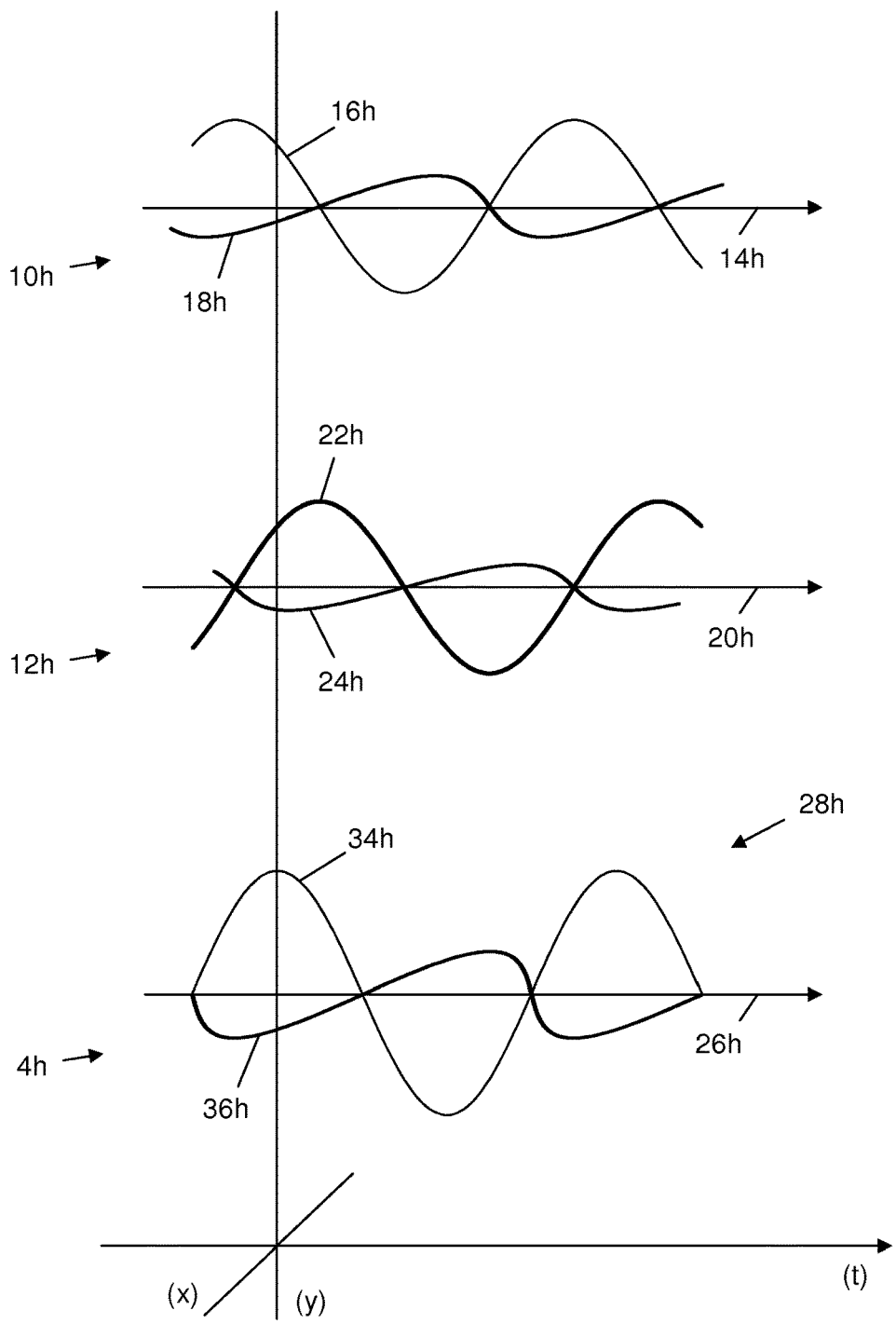
FIG. 3-a

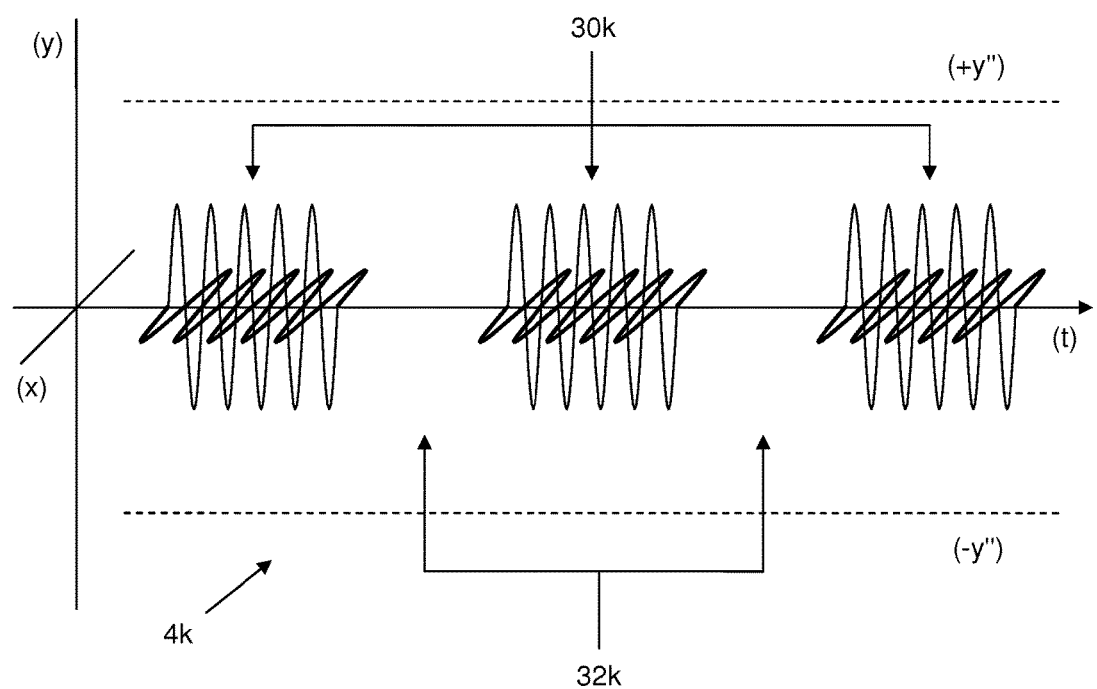
FIG. 3-b

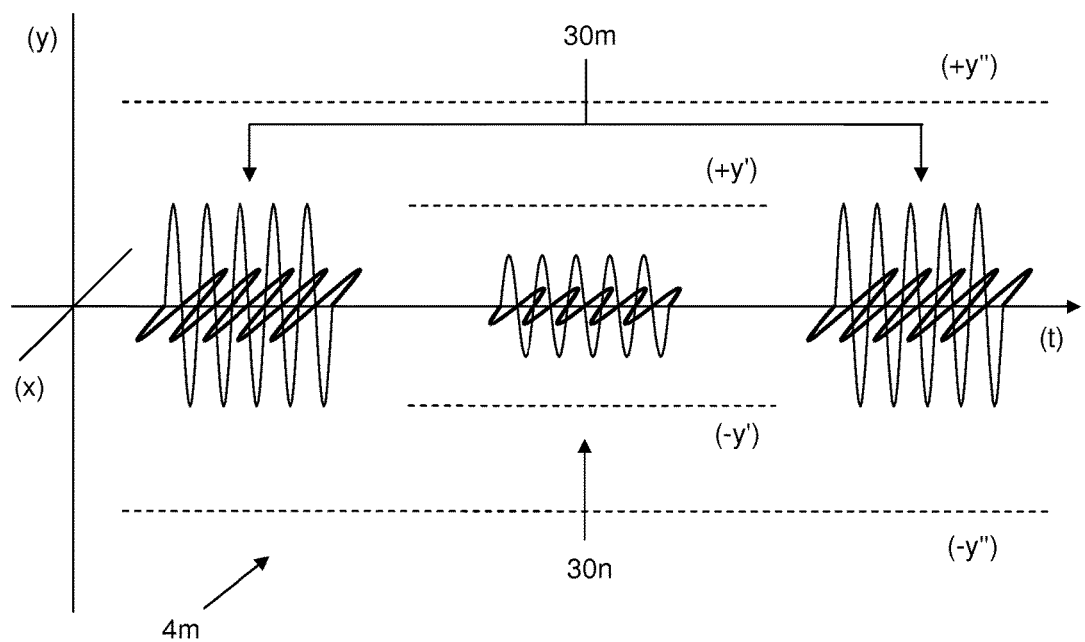
FIG. 3-c

ENERGY EFFICIENT METHOD OF COHERENTLY TRANSMITTING ELECTROMAGNETICALLY NEUTRALIZED RADIATION PRODUCED WITH DESTRUCTIVE INTERFERENCE TO A TARGET

BACKGROUND OF THE INVENTION

Field of the Invention

In general, the field of the present invention pertains to methods of transmitting energy. More specifically, the scope of the field of the present invention includes methods of transmitting energy for power transmission, and methods of transmitting energy in the form of signals for communications.

PRIOR ART OF THE INVENTION

In general, prior art pertinent to the present invention includes certain basic principles of the wave-particle duality of quantum mechanics. Wherein, in quantum mechanics, a beam of radiation (i.e., a beam of wave-particle behaving entities in significantly large quantities in quantum mechanical terms such as, for example, a beam of quanta of electromagnetic radiation, a beam of propagating electrons, or a beam of propagating protons which comprise particles in significantly large quantities in quantum mechanical terms) can electromagnetically interact with electrically charged particles comprised in a medium in which the beam is propagating in direct proportion to the time-averaged energy flux density (i.e., the intensity) of the beam while the beam is propagating in the medium. Such electromagnetic interaction of a beam of radiation with a transmission medium can be adverse such that a beam of quanta of electromagnetic radiation can suffer adverse electromagnetic-based scattering and/or absorption by particles, which comprise electrically charged particles, in a respective transmission medium; or such that a beam of electrically charged particles can suffer adverse Coulomb force based collisions with electrically charged particles in a respective transmission medium.

For the purpose of describing the present invention in the patent disclosure herein, a beam of radiation is considered to be totally electromagnetically neutralized when a beam is associated with coherent, forward traveling waves which are superimposed totally out of phase so as to produce total destructive interference and total cancellation of the correspondingly associated electromagnetic fields. While, a beam of radiation is considered to be partly electromagnetically neutralized when a beam is associated with coherent, forward traveling waves which are superimposed partly out of phase so as to produce partial destructive interference and partial constructive interference, and so as to produce partial cancellation and partial reinforcement of the correspondingly associated electromagnetic fields. Wherein, the electromagnetic interaction of a beam of electromagnetically neutralized radiation with electrically charged particles comprised in a medium in which the beam is propagating is eliminated in direct proportion to the destructive interference in, and the corresponding time-averaged energy flux density which is eliminated from, the neutralized beam during transmission in the medium. (Note that the electromagnetic neutralization of a beam is considered to include the electric charge neutralization of the electrically charged particles in the electromagnetically neutralized beam in direct proportion to the corresponding electromagnetic neutralization of the beam when a beam of electromagnetically neutralized electrically charged particles is applied.)

Now, more specific prior art pertinent to the present invention includes, for example, prior art which applies an interferometric system comprising a source of intense, forward propagating radiation and an interferometer in order to "eliminate energy" from the respective prior art system (e.g., prior art which applies an anti-reflecting thin film system in order to eliminate glare or, in general, back reflections from the prior art system). In contrast, for its own respective applications, the present invention applies a source of electromagnetically intense, coherent, forward propagating radiation and an interferometer for producing a beam of electromagnetically neutralized radiation which is applied for transmitting energy from one location to another location where there is a target, such that energy is transmitted in an energy efficient manner (i.e., such that energy is conserved within the beam during transmission), and then, in due course in the present invention, the transmitted energy is utilized by the target in order to produce a result in an overall effective manner.

Accordingly, in some generalized preferred embodiments in which the present invention is applied for the transmission and subsequent utilization of energy in an effective manner, apparatus provided, which comprises a source of electromagnetically intense, coherent, forward propagating radiation and an interferometer, produces a beam of electromagnetically neutralized radiation which is, then, coherently transmitted by transmission apparatus to a target comprising a utilization apparatus. In which case, the adverse electromagnetic interaction of the electromagnetically neutralized beam with electrically charged particles comprised in the coherent transmission apparatus is eliminated in direct proportion to the time-averaged energy flux density which is eliminated from the electromagnetically neutralized beam during transmission, such that the adverse electromagnetic effects of transmitting energy are eliminated in direct proportion to the extent to which such adverse electromagnetic interaction is eliminated. Then, in due course, energy is transferred from the transmitted beam to the utilization apparatus in order to produce a result.

Prior art pertinent to the present invention for power transmission includes, in particular, electrical power transmission systems which apply electrical conductors (e.g., copper wire, copper cable, or superconductors) for conducting electricity for power. Wherein, copper wire and cable related prior art systems both have disadvantages which include energy inefficiency due to power attenuation. While, in particular, copper cable related prior art power transmission systems have disadvantages which include energy inefficiency due to transmission loss, dangerously high electrical voltages associated with relatively high voltage power lines, adverse antenna-based effects (including the adverse production of extra low frequency, i.e., ELF, electric and magnetic fields; and adverse electromagnetic interference effects), and have the disadvantage of a relatively high cost as pertains to, for example, the cost of applying copper cable of relatively high purity and the cost of insulation. While still, superconductors, in particular, require relatively high amounts of energy for cooling in order to transmit energy for power in a relatively high energy efficient manner.

The application of the present invention for power transmission applies a method which produces a beam of electromagnetically neutralized radiation which is, then, coherently transmitted to a power utilization apparatus without the adverse electromagnetic interaction of the neutralized beam with electrically charged particles comprised in the coherent transmission medium (e.g., coherently transmitting air filled tubing) in direct proportion to the time-averaged energy flux density which is eliminated from the electromagnetically neutralized beam during transmission. In which case, the adverse electromagnetic effects of transmitting energy for power such as energy inefficiency due to power attenuation, relatively high voltages, and certain adverse antenna-based effects (as aforementioned with respect to the prior art) are considered to be decreased with the application of the method of the present invention. While furthermore, the high cost of making a power conveying medium is considered to be reduced with the application of the method of the present invention by, for example, applying air filled tubing instead of copper cables and superconductors as applied in respectively related prior art power transmission systems. Wherein, nevertheless, the present invention provides for a form of electromagnetically "resistance-less" or "low-resistance" power transmission depending upon if the applied beam of electromagnetically neutralized radiation is totally or partly electromagnetically neutralized, respectively.

Prior art pertinent to the present invention for wireline communications includes copper wire, coaxial cable, and fiber optic communications systems. Wherein, such prior art communications systems have disadvantages which include the following: a) signal attenuation by the respective transmitting medium, which disadvantageously causes the unnecessary need for relatively high power transmitter output and/or the need for unnecessary signal amplification (or also regeneration); b) the exclusion of bandwidth in terms of frequencies due to signal attenuation by the respective transmitting medium; c) a loss of bandwidth due to relatively slow signal propagation speed, which in the case of an optical fiber, for example, is due to a relatively high refractive index of an optical fiber compared to the air filled tubing which is applied as the transmitting medium in some preferred embodiments of the present invention; and, with respect to fiber optic communications systems in particular, a prior art fiber optic communications system has the disadvantage of d) the relative high cost of making and deploying optical fibers.

The application of the present invention for wireline communications applies a data-encoded beam of electromagnetically neutralized quanta of electromagnetic radiation which is coherently transmitted to a receiver without the adverse electromagnetic interaction of the neutralized beam with electrically charged particles comprised in the coherent transmission medium (e.g., air filled tubing or optical fiber) in direct proportion to the time-averaged energy flux density which is eliminated from the electromagnetically neutralized beam during transmission. Wherein, the adverse electromagnetic effects of transmitting data for wireline communications are eliminated in direct proportion to the extent to which such adverse electromagnetic interaction is eliminated.

In which case, for example, signal attenuation is eliminated in direct proportion to the time-averaged energy flux density which is eliminated from the coherently transmitted beam of electromagnetically neutralized quanta of electromagnetic radiation during transmission so as to increase the distance a signal can travel without being amplified (or also regenerated), such that the need for relatively high transmitter power output and/or the need for signal amplification (or also regeneration) is eliminated to a directly proportional extent, and such that the bandwidth (in terms of frequencies) which is available for signal transmission is increased. While also, the refractive index of the transmitting medium can be decreased with the application of air filled tubing as the transmitting medium relative to, in particular, an optical fiber, such that the speed at which a signal travels can be increased, and therefore the bandwidth (in terms of the speed of data transmission) can be increased. While, moreover, the present invention is considered to eliminate some of the cost of making and deploying a conveying medium for high bandwidth data transmission in wireline communications in preferred embodiments where air filled tubing is applied instead of, for example, optical fiber, and thus eliminate certain complications in, for example, the so called "last mile problem."

Other prior art pertinent to the present invention for communications includes wireless communications systems for transmitting electromagnetic radiation for data transmission. Wherein, such prior art communications systems have disadvantages which include signal attenuation by the transmitting medium comprising air, which disadvantageously causes the unnecessary need for relatively high power transmitter output and/or the need for unnecessary signal amplification (or repeating), and thus also disadvantageously excludes bandwidth (in terms of frequencies) due to signal attenuation by the transmitting medium.

The application of the present invention for wireless communications applies a data-encoded beam of electromagnetically neutralized quanta of electromagnetic radiation which is coherently transmitted to a receiver without the adverse electromagnetic interaction of the neutralized beam with electrically charged particles comprised in the coherent transmission medium, which includes air, in direct proportion to the time-averaged energy flux density which is eliminated from the electromagnetically neutralized beam during transmission. Wherein, the adverse electromagnetic effects of transmitting data for wireless communications are eliminated in direct proportion to the extent to which such adverse electromagnetic interaction is eliminated, e.g., signal attenuation is eliminated in direct proportion to the time-averaged energy flux density which is eliminated from the coherently transmitted beam of electromagnetically neutralized quanta of electromagnetic radiation during transmission so as to increase the distance a signal can travel without being amplified (or repeated), such that the need for relatively high transmitter power output and/or the need for signal amplification (or repeating) is eliminated to a directly proportional extent, and such that the bandwidth (in terms of frequencies) which is available for signal transmission is increased.

SUMMARY OF THE INVENTION

In summary, the present invention is applied for coherently transmitting electromagnetically neutralized radiation in an energy efficient manner to a target which, then, utilizes the transmitted energy to produce a result. Accordingly, the present invention is applied as follows:

Step 1) Apparatus comprising a source of electromagnetically intense, coherent, forward propagating radiation and an interferometer (e.g., a version of a Michelson interferometer or a version of a Mach-Zehnder interferometer) produces a beam of electromagnetically neutralized radiation. Wherein, the beam of electromagnetically neutralized radiation comprises coherent, forward propagating radiation (in significantly large quantities in quantum mechanical terms) which comprises forward propagating photons or forward propagating electrically charged particles of the same sort, e.g., forward propagating electrons, which have associated forward traveling waves which destructively interfere to an extent, and have electromagnetic fields which cancel to a corresponding extent;

Step 2) The beam of electromagnetically neutralized radiation is coherently transmitted in an energy efficient manner through coherent transmission apparatus (e.g., air filled tubing, optical fiber, or air) to a target. In which case, the adverse electromagnetic interaction of the neutralized beam with electrically charged particles comprised in the transmission apparatus (e.g., adverse electromagnetic-based scattering and/or absorption), and the adverse electromagnetic effects of transmitting energy (e.g., power attenuation), are eliminated in direct proportion to the destructive interference in, and the corresponding time-averaged energy flux density (i.e., the intensity) which is eliminated from, the electromagnetically neutralized beam during transmission. (Note that the electromagnetic neutralization of a beam is considered to include the electric charge neutralization of the electrically charged particles in the electromagnetically neutralized beam in direct proportion to the corresponding electromagnetic neutralization of the beam when a beam of electromagnetically neutralized electrically charged particles is applied.); and then Step 3) Energy is transferred, in due course, from the transmitted beam to the target (e.g., a transducer) in order to produce a result (e.g., electric voltage or electric current).

In the patent disclosure herein, the present invention is applied in some generalized preferred embodiments for the transmission and subsequent utilization of energy in an effective manner in a series of general applications which operate in accordance with the generalized portion of the summarization hereinbefore. Wherein, in each such embodiment, apparatus provided, which comprises a source of electromagnetically intense, coherent, forward propagating radiation and an interferometer, produces a beam of electromagnetically neutralized radiation which is, then, coherently transmitted by coherent transmission apparatus to a target comprising a utilization apparatus. In which case, in each such embodiment, the adverse electromagnetic interaction of the neutralized beam with electrically charged particles in the transmission apparatus is eliminated in direct proportion to the time-averaged energy flux density which is eliminated from the electromagnetically neutralized beam during transmission, such that the adverse electromagnetic effects of transmitting energy are eliminated to a directly proportional extent.

Then, in due course, energy is transferred from the transmitted beam to the utilization apparatus in order to produce a result by a utilization process which comprises one of the following examples depending on the embodiment which is applied:

1a) A momentum-based utilization process in which apparatus comprising, for example, a pressure transducer utilizes pressure which is applied by a transmitted electromagnetically neutralized particle beam (which comprises electromagnetically neutralized quanta of electromagnetic radiation or electromagnetically neutralized electrically charged particles) in order to produce electrical voltage, e.g., for supplying power to a load, or for providing retrievable data for communications when the momentum comprised by the neutralized particle beam is modulated so as to be encoded with data; or 1b) The momentum-based utilization process can be repeated by reflecting the transmitted electromagnetically neutralized particle beam, and then coherently transmitting the neutralized beam to at least one other pressure transducer (and apply pressure thereon) and/or by reflecting the neutralized beam back to the first pressure transducer (and apply pressure thereon), and then utilizing the pressure which is applied by the neutralized beam at least one more time in order to produce a plurality of electrical voltages, e.g., for supplying power to more than one load and/or for supplying more power to one load; or, still yet, the momentum-based utilization process can be repeated as such in order to provide data which can be retrieved over an interval of time when the momentum comprised by the neutralized particle beam is modulated so as to be encoded with data, in which case the momentum comprised by the neutralized particle beam is utilized, for example, for data buffering or data caching;

2) An electromagnetic-based utilization process in which apparatus utilizes a transmitted beam of partly electromagnetically neutralized radiation by way of electromagnetic interaction when a beam of partly electromagnetically neutralized radiation is applied, e.g., a process in which an electromagnetic-based detector utilizes a transmitted beam of partly electromagnetically neutralized radiation in order to produce electrical output, e.g., voltage or current output; or 3) A utilization process in which the target incoherently scatters a transmitted electromagnetically neutralized beam so as to produce a beam of electromagnetically intense radiation comprising incoherent radiation, which is utilized by way of electromagnetic interaction, in due course, by an electromagnetic-based utilization apparatus in order to produce a result, e.g., a process in which an electromagnetic-based detector utilizes the electromagnetically intense beam in order to produce electrical output, e.g., voltage or current output (wherein the utilizing apparatus also utilizes any transmitted remaining portion of a beam of partly electromagnetically neutralized radiation which is not incoherently scattered if a beam of partly electromagnetically neutralized radiation is applied).

Other generalized preferred embodiments of the present invention are different by applying a filtering apparatus to eliminate any unwanted electromagnetically intense radiation which may be produced by systematic and/or random error from an applied beam of electromagnetically neutralized radiation. While, yet other generalized embodiments apply shielding apparatus in whole, or in part, around an embodiment in order to shield the environment from electromagnetically neutralized and/or electromagnetically intense radiation which travels beyond a desired boundary around an embodiment of the present invention.

Other embodiments describe different ways the present invention can be adjusted in order to effectively accomplish the result of an application of the present invention. Such embodiments include an embodiment which describes time-averaged particle flux density adjustment, embodiments which describe time-averaged energy flux density adjustments, and an embodiment which describes focal point depth positioning adjustment.

More specific preferred embodiments are applied for the transmission and subsequent utilization of power (per se) in an effective manner. Wherein, in each such embodiment, apparatus provided, which comprises a source of electromagnetically intense, coherent, forward propagating radiation and an interferometer, produces a beam of electromagnetically neutralized radiation which is then coherently transmitted by a coherent transmission medium, which includes, more specifically, air filled tubing, to a target comprising, more specifically, a power utilization apparatus. In which case, in each such embodiment, the adverse electromagnetic interaction of the neutralized beam with electrically charged particles in the air filled tubing is eliminated (e.g., adverse electromagnetic-based scattering and absorption) in direct proportion to the time-averaged energy flux density which is eliminated from the electromagnetically neutralized beam during transmission, such that the adverse electromagnetic effects of transmitting energy for power (e.g., power attenuation) are eliminated to a directly proportional extent.

Then, in due course, energy is transferred from the transmitted beam to the utilization apparatus in order to produce a result by, more exclusively, a power utilization process which includes one of the following examples depending upon the embodiment applied: a) a momentum-based utilization process in which apparatus comprising, for example, a pressure transducer utilizes pressure applied by a transmitted electromagnetically neutralized particle beam (which comprises electromagnetically neutralized quanta of electromagnetic radiation or electromagnetically neutralized electrically charged particles) in order to produce electrical voltage for supplying power to a load; b) an electromagnetic-based utilization process in which apparatus utilizes the power of a transmitted beam of partly electromagnetically neutralized radiation by way of electromagnetic interaction, e.g., an electromagnetic-based detector utilizes a transmitted beam of partly electromagnetically neutralized radiation in order to produce electrical output for supplying power to a load (when a beam of partly electromagnetically neutralized radiation is applied); or c) a utilization process in which the target incoherently scatters a transmitted beam of electromagnetically neutralized radiation so as to produce a beam of electromagnetically intense radiation comprising incoherent radiation which then, in due course, is utilized by way of electromagnetic interaction by an electromagnetic-based utilization apparatus, e.g., an electromagnetic-based detector, in order to produce electrical output for supplying power to a load, i.e., utilizes the respectively produced incoherent beam, or also utilizes any transmitted remaining portion of a beam of partly electromagnetically neutralized radiation which is not incoherently scattered if a beam of partly electromagnetically neutralized radiation is applied.

Other more specific preferred embodiments are applied for the transmission and subsequent utilization of data in an effective manner for wireline communications. Wherein, in each such embodiment, apparatus provided, which comprises a miniature laser and an interferometer, produces a modulated beam of electromagnetically neutralized quanta of electromagnetic radiation which is, then, coherently transmitted by a coherent transmission medium, which includes, more exclusively, air filled tubing or optical fiber, to a receiver which, then, utilizes the data encoded in the modulated beam for communications by a method which applies one of the power utilization processes which were previously described for embodiments which transmit and subsequently utilize power (per se), except that the data encoded in the power of the transmitted neutralized beam is utilized by the receiver for communications.

Nevertheless, in each such embodiment, the adverse electromagnetic interaction of the coherently transmitted beam of electromagnetically neutralized quanta of electromagnetic radiation with electrically charged particles in the air filled tubing or the optical fiber (e.g., adverse electromagnetic-based scattering, such as Rayleigh scattering, and adverse electromagnetic-based absorption) is eliminated in direct proportion to the time-averaged energy flux density which is eliminated from the electromagnetically neutralized beam during transmission, such that the adverse electromagnetic effects of transmitting energy for wireline communications are eliminated to a directly proportional extent. In which case, for example, signal attenuation is eliminated in direct proportion to the time-averaged energy flux density which is eliminated from the beam of electromagnetically neutralized quanta of electromagnetic radiation during transmission so as to increase the distance a signal can travel without being amplified (or also regenerated), such that the need for relatively high transmitter power output and/or the need for signal amplification (or also regeneration) is eliminated to a directly proportional extent, and such that the bandwidth (in terms of frequencies) which is available for signal transmission is increased. While also, the refractive index of the transmitting medium can be decreased with the application of air filled tubing relative to, in particular, an optical fiber, such that the speed at which a signal travels can be increased, and therefore the bandwidth (in terms of the speed of data transmission) can be correspondingly increased. While, moreover, the complexities of making and deploying a conveying medium for high bandwidth data transmission for wireline communications can be eliminated to an extent by applying air filled tubing instead of optical fiber.

Still other more specific preferred embodiments of the present invention combine the uses of the present invention for power and wireline communications. In which case, such embodiments each employ a method which is applied for efficiently transmitting the energy of a modulated beam of electromagnetically neutralized radiation along air filled tubing or optical fiber to a target which, then, utilizes the power in the transmitted beam for both power per se as a utility and for the data encoded in the power of the transmitted beam for communications.

While, still yet other more specific preferred embodiments are applied for wireless communications in an effective manner, and are different from the previously described preferred embodiments which are applied for wireline communications in that each applies a method which includes the coherent transmission of a beam of electromagnetically neutralized quanta of electromagnetic radiation through air instead of air filled tubing or optical fiber. Wherein, in each such embodiment, the adverse electromagnetic interaction of a beam of electromagnetically neutralized quanta of electromagnetic radiation with electrically charged particles comprised in the air (e.g., adverse electromagnetic-based scattering, such as Rayleigh scattering, and adverse electromagnetic-based absorption) is eliminated in direct proportion to the time-averaged energy flux density which is eliminated from the electromagnetically neutralized beam during transmission, such that the adverse electromagnetic effects of transmitting energy for wireless communications are eliminated to a directly proportional extent, e.g., signal attenuation is eliminated in direct proportion to the time-averaged energy flux density which is eliminated from the beam of electromagnetically neutralized quanta of electromagnetic radiation during transmission so as to increase the distance a signal can travel without being amplified (or repeated), such that the need for relatively high transmitter power output and/or the need for signal amplification (or repeating) is eliminated to a directly proportional extent, and such that the bandwidth (in terms of frequencies) which is available for signal transmission is increased.

BRIEF DESCRIPTION OF THE DRAWINGS

FIG. (1) illustrates a side view of a generalized drawing of a preferred embodiment of the present invention (illustrated in a general way with block drawing) which is applied for the transmission and subsequent utilization of energy in an effective manner, in which case a beam of electromagnetically neutralized radiation is applied.

FIG. (1') is a top view of a somewhat detailed illustration of one version of the preferred embodiment which is illustrated in FIG. (1), and especially illustrates apparatus (2') (comprising a version of a Michelson interferometer) which is one version of apparatus (2) which is illustrated in FIG. (1).

Figure 1:
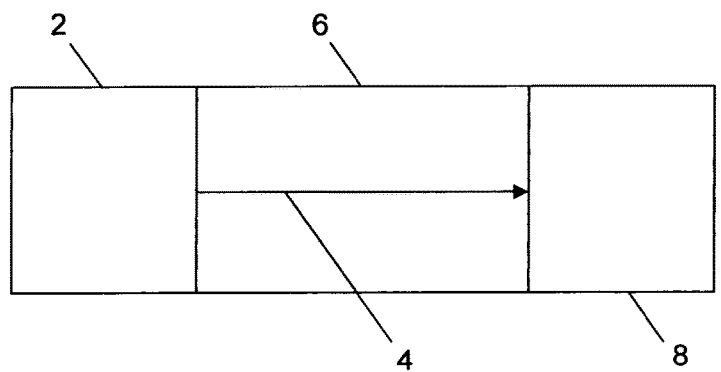
Figure 1:
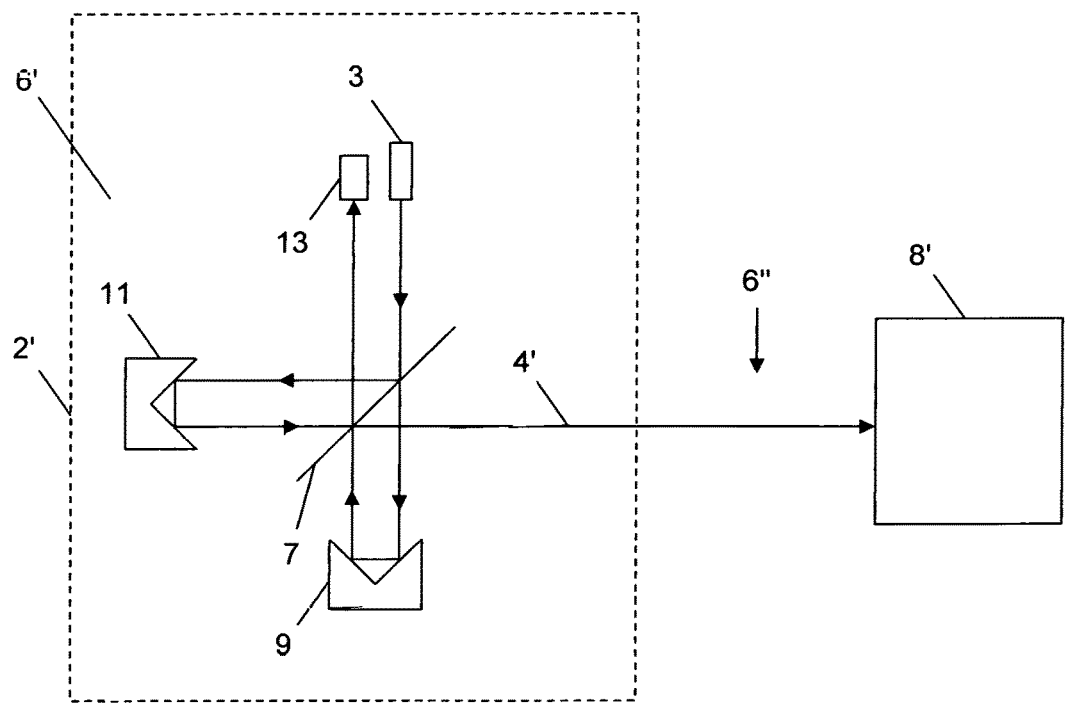

FIG. (2) illustrates a side view of a somewhat generalized preferred embodiment of the present invention which is applied for the transmission and subsequent utilization of energy in an effective manner, and is more specific than the preferred embodiment which is illustrated in FIG. (1) by applying a beam of totally electromagnetically neutralized radiation.

FIG. (2-a) illustrates the construction of a beam of totally electromagnetically neutralized quanta of electromagnetic radiation which is one version of the beam of totally electromagnetically neutralized radiation which is illustrated in FIG. (2).

FIG. (2-b) illustrates a pulsed beam of totally electromagnetically neutralized quanta of electromagnetic radiation which is another version of the beam of totally electromagnetically neutralized radiation which is illustrated in FIG. (2).

FIG. (2-c) illustrates an amplitude modulated (i.e., momentum amplitude modulated) pulsed beam of totally electromagnetically neutralized quanta of electromagnetic radiation which is digitally encoded with binary data, and is yet another version of the beam of totally electromagnetically neutralized radiation which is illustrated in FIG. (2).

FIG. (3) illustrates a side view of another somewhat generalized preferred embodiment of the present invention which is applied for the transmission and subsequent utilization of energy in an effective manner, and is more specific than the preferred embodiment which is illustrated in FIG. (1) by applying a beam of partly electromagnetically neutralized radiation.

FIG. (3-a) illustrates the construction of a beam of partly electromagnetically neutralized quanta of electromagnetic radiation which is one version of the beam of partly electromagnetically neutralized radiation which is illustrated in FIG. (3).

FIG. (3-b) illustrates a pulsed beam of partly electromagnetically neutralized quanta of electromagnetic radiation which is another version of the beam of partly electromagnetically neutralized radiation which is illustrated in FIG. (3).

FIG. (3-c) illustrates an amplitude modulated (i.e., momentum amplitude modulated) pulsed beam of partly cicctromagnetically neutralized quanta of electromagnetic radiation which is digitally encoded with binary data, and is yet another version of the beam of partly electromagnetically neutralized radiation which is illustrated in FIG. (3).

FIG. (4) illustrates a side view of one generalized preferred embodiment of the present invention which is applied for the transmission and subsequent utilization of energy in an effective manner, in which case the momentum comprised by a transmitted electromagnetically neutralized particle beam is utilized by a momentum-based utilizing apparatus (e.g., a pressure transducer) comprised in a target.

FIG. (5) illustrates a side view of another generalized preferred embodiment which is applied for the transmission and subsequent utilization of energy in an effective manner, in which case a transmitted beam of partly electromagnetically neutralized radiation is utilized by an electromagnetic-based utilizing apparatus (e.g., a photodetector or a particle detector) comprised in a target.

FIG. (6) illustrates a side view of a generalized conditional preferred embodiment which is applied for the transmission and subsequent utilization of energy in an effective manner, in which case certain steps are applied depending upon the beam of electromagnetically neutralized radiation which is applied, and depending upon the incoherently scattering apparatus which is (or are) applied in the target.

FIG. (7) illustrates a side view of another generalized preferred embodiment which is applied for the transmission and subsequent utilization of energy in an effective manner, in which case a beam of electromagnetically neutralized radiation is applied, but, differently, incoherently scattering and transmitting apparatus is combined with electromagnetic-based utilization apparatus within one apparatus in a target.

FIGS. (8a) and (8b) illustrate side views of two hypothetical embodiments of the present invention which together represent one aspect of the significance of adjusting the time-averaged particle flux density of a beam of electromagnetically neutralized radiation which is applied in the present invention.

FIGS. (9a) and (9b) illustrate side views of two hypothetical embodiments of the present invention which together represent one aspect of the lack of the significance of adjusting the time-averaged energy flux density of a beam of electromagnetically neutralized radiation which is applied in the present invention.

FIGS. (10a) and (10b) illustrate side views of two hypothetical embodiments of the present invention which together represent one aspect of the significance of adjusting the time-averaged energy flux density of a beam of electromagnetically neutralized radiation which is applied in the present invention.

FIGS. (11a) and (11b) illustrate side views of two hypothetical embodiments of the present invention which together represent one aspect of the significance of adjusting the depth of the focal point of a beam of electromagnetically neutralized radiation within an incoherently scattering and transmitting target apparatus which is applied in the present invention.

FIG. (12a) is an illustration of a side view of a somewhat specific preferred embodiment of the present invention which is applied for transmitting power in an effective manner, and includes a longitudinally sectioned view of the respectively applied air filled tubing.

FIG. (12b) is an illustration of a side view of a somewhat different preferred embodiment of the present invention which is applied for transmitting power in an effective manner, which also includes a longitudinally sectioned view of the respectively applied air filled tubing, and is different by applying air filled tubing as a coupler.

FIG. (12c) is an illustration of a side view of another somewhat different preferred embodiment of the present invention which is applied for transmitting power in an effective manner, which also includes a longitudinally sectioned view of the respectively applied air filled tubing, and is different by applying air filled tubing as a splitter.

FIG. (12d) is an illustration of a side view of yet another somewhat different preferred embodiment of the present invention which is applied for transmitting power in an effective manner, which also includes a longitudinally sectioned view of the respectively applied air filled tubing, and is different by applying air filled tubing as a coupler and a splitter.

FIG. (13) is an illustration of a side view of a somewhat specific preferred embodiment of the present invention which is applied for transmitting data in an effective manner for wireline communications, and includes a longitudinally sectioned view of the air filled tubing which is respectively applied for data transmission.

FIG. (14) illustrates a side view of another somewhat specific preferred embodiment of the present invention which is applied for transmitting data in an effective manner for wireline communications, and is different by applying wave division multiplexing and demultiplexing.

FIG. (14') illustrates a side view of yet another somewhat specific preferred embodiment which is applied for transmitting data in an effective manner for wireline communications which is a more specific version of the preferred embodiment which is illustrated in FIG. (14) by applying a prism as a multiplexer and a prism as a demultiplexer in a wave division multiplexing and demultiplexing method of wireline communications.

Figure 13:
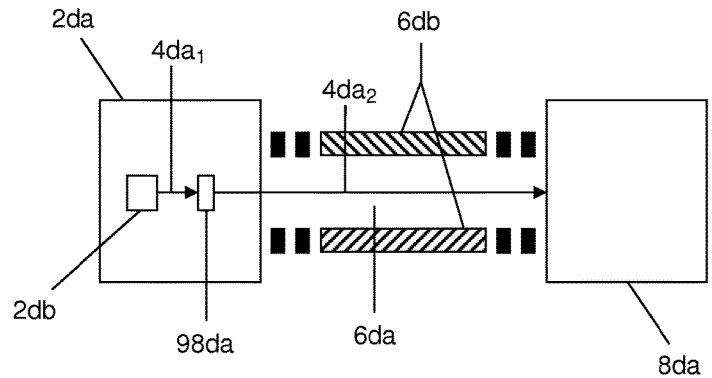

FIG. (15) illustrates a somewhat specific preferred embodiment of the present invention which is applied for transmitting data in an effective manner for wireless communications which is different from certain embodiments for wireline communications (including the preferred embodiment which is illustrated in FIG. 13) by applying a method which includes the application of air as a coherent transmission medium instead of air filled tubing.

Figure 14:
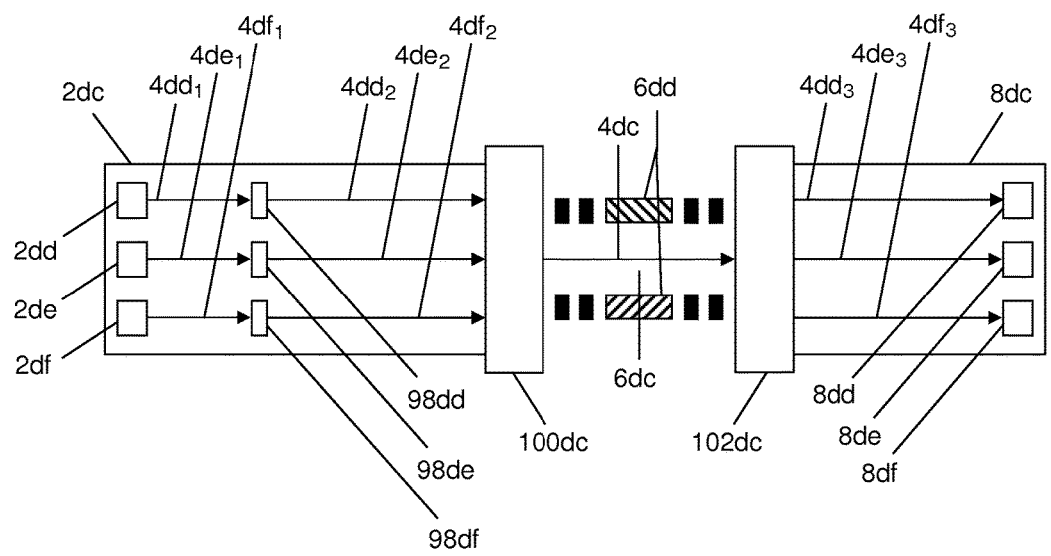
Figure 14:
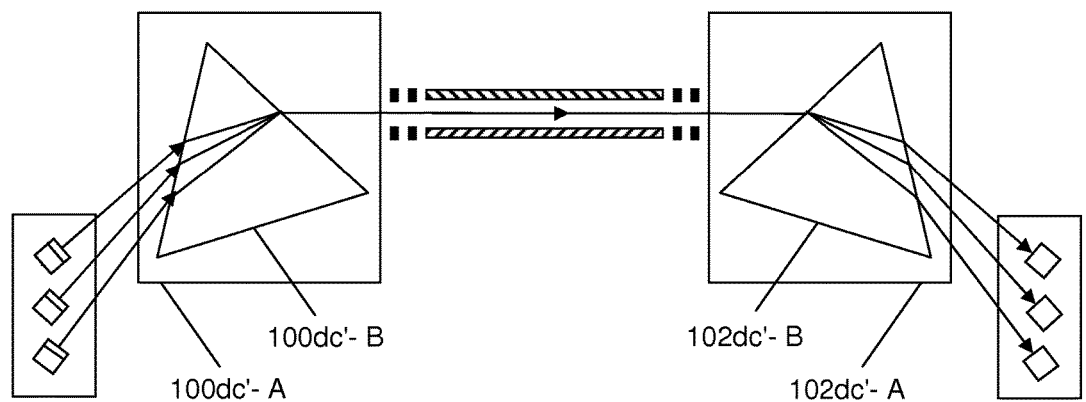
Figure 15:
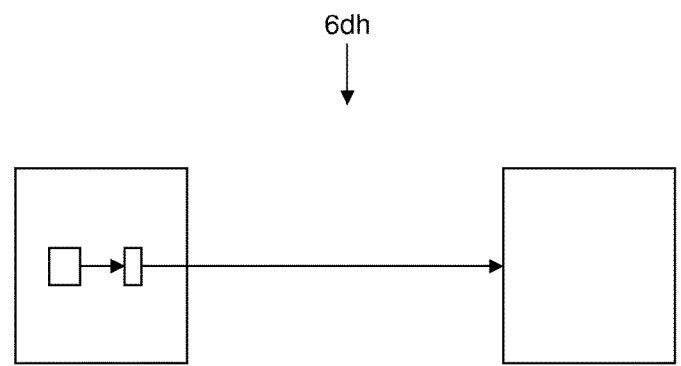
Figure 16:
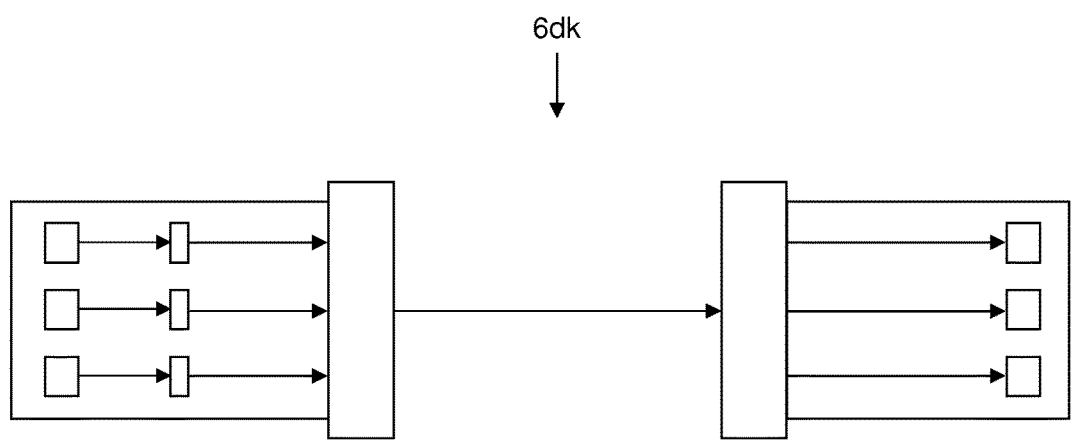

FIG. (16) illustrates a side view of another somewhat specific preferred embodiment of the present invention which is applied for transmitting data in an effective manner for wireless communications, and is different from certain embodiments for wireline communications (including the preferred embodiment which is illustrated in FIG. 14) by applying a method of wave division multiplexing and demultiplexing which includes the application of air as a coherent transmission medium instead of air filled tubing.

DETAILED DESCRIPTION OF THE INVENTION

First, certain general modes of operating the present invention are described in some generalized embodiments which include descriptions of some ways certain embodiments of the present invention can be adjusted in order to accomplish their overall objectives in an effective manner. Then, certain more specific modes of operating the present invention are described in some more specific embodiments for applications comprising power transmission and communications. (Refer to the notes at the end of this detailed description for the clarification of certain terms applied herein.)

FIG. (1) illustrates a side view of a generalized preferred embodiment of the present invention (illustrated in a general way with block drawing) which is applied for efficiently transmitting energy from one location to another location where there is a target which, subsequently, utilizes the transmitted energy, such that a result is produced in an overall effective manner. The preferred embodiment which is illustrated in FIG. (1) is applied as follows:

Step 1) Apparatus (2), comprising a source of electromagnetically intense, coherent, forward propagating radiation (e.g., a laser or a source of a beam of intense, coherent, forward propagating electrons) and an interferometer (e.g., a version of a Michelson interferometer as illustrated in FIG. 1' or a version of a Mach-Zehnder interferometer), produces a beam of electromagnetically neutralized radiation (4). Beam (4) comprises, as examples, a beam of electromagnetically neutralized quanta of electromagnetic radiation (comprising photons), or a beam of electromagnetically neutralized electrically charged particles of the same sort, e.g., a beam of electromagnetically neutralized electrons.

In more detail, the beam of electromagnetically neutralized radiation (4) comprises coherent, forward propagating radiation which comprises wave-particle behaving entities (in significantly large quantities in quantum mechanical terms) which each have an oscillatorily time-varying electromagnetic field with an associated forward traveling wave, total energy, and momentum. Wherein, the waves which are associated with beam (4) (such as coherent, forward traveling, transverse waves which are associated with a beam of electromagnetically neutralized quanta of electromagnetic radiation) are superimposed out of phase to an extent so that the displacement vectors of the waves, which are associated with the beam, cancel in direct proportion to the extent to which the waves are out of phase, such that the waves destructively interfere, and the associated electromagnetic fields cancel, to a corresponding extent.

Note that a beam of electromagnetically neutralized radiation can comprise a beam of totally electromagnetically neutralized radiation which is produced by the total destructive interference of waves and the total cancellation of associated electromagnetic fields, such that the beam is totally electromagnetically neutralized in agreement with the total elimination of time-averaged energy flux density from the beam, as relates to certain preferred embodiments which follow including the preferred embodiment which pertains to FIG. (2); or a beam of electromagnetically neutralized radiation can comprise a beam of partly electromagnetically neutralized radiation which is produced by the partial destructive interference of waves and the partial cancellation of associated electromagnetic fields, such that a beam of partly electromagnetically neutralized radiation is electromagnetically neutralized in direct proportion to the time-averaged energy flux density which is eliminated from the partly neutralized beam, as relates to certain preferred embodiments which follow including the preferred embodiment which pertains to FIG. (3). Also, note that the electromagnetic neutralization of a beam is considered to include the electric charge neutralization of the electrically charged particles in the electromagnetically neutralized beam in direct proportion to the corresponding electromagnetic neutralization of the beam when a beam of electromagnetically neutralized electrically charged particles is applied;

Step 2) From apparatus (2), the beam of electromagnetically neutralized radiation (4) is coherently transmitted by coherent transmission apparatus (6) (e.g., air filled tubing, optical fiber, or air) to target (8). Here, again, during coherent transmission by apparatus (6) to target (8), beam (4) is associated with coherent, forward traveling waves which are superimposed out of phase to an extent so as to produce destructive interference to an extent, such that the associated electromagnetic fields in beam (4) cancel to a corresponding extent.

In effect, the adverse electromagnetic interaction of electromagnetically neutralized beam (4) with electromagnetically intense entities (e.g., electrically charged particles) comprised in coherent transmission apparatus (6) is eliminated in direct proportion to the destructive interference in, and the corresponding time-averaged energy flux density (i.e., the intensity) which is (or remains) eliminated from, beam (4) during transmission. In which case, adverse electromagnetic-based scattering and/or absorption of beam (4) by coherent transmission apparatus (6) can be eliminated to a respective extent when a beam of electromagnetically neutralized quanta of electromagnetic radiation is applied, or adverse Coulomb force based collisions of electrically charged particles in beam (4) with electrically charged particles comprised in coherent transmission apparatus (6) can be eliminated to a respective extent when a beam of electromagnetically neutralized electrically charged particles is applied. Wherein, consequentially, the adverse electromagnetic effects of transmitting energy (e.g., beam attenuation) are eliminated in direct proportion to the extent to which such adverse electromagnetic interaction is eliminated; and then Step 3) Energy is transferred, in due course, from the transmitted beam to a utilization apparatus comprising a transducer, which is comprised in target (8), in order to produce a result (e.g., electric voltage or electric current).

Note that an electromagnetically intense entity comprised in coherent transmission apparatus (6) can comprise the following: 1) an electrically charged particle comprising: a) a static electrically charged particle, e.g., a static proton or a static electron; b) an electron in an orbital of an atom or a molecule; or c) a freely propagating electrically charged particle (on average over time), e.g., an electron or proton which is propagating by itself (on average over time), or an electron or a proton which is propagating in a beam of electrically charged particles comprising a non-zero magnitude of time-averaged energy flux density; or, exclusively for the application of a beam of electromagnetically neutralized electrically charged particles herein, an electromagnetically intense entity can comprise 2) a quantum of electromagnetic radiation, e.g., a quantum of electromagnetic radiation which is propagating by itself (on average over time), or a quantum of electromagnetic radiation comprised in a beam of quanta of electromagnetic radiation which comprises a non-zero magnitude of time-averaged energy flux density.

Also, note that a given beam of electromagnetically neutralized radiation also comprises a time-averaged particle flux density which can be calculated by the quantization of the momentum of the given electromagnetically neutralized beam which can be measured, for example, by pressure detection; or calculated by the quantization of the time-averaged energy flux density of a hypothetical beam of radiation which is equivalent to the given beam of electromagnetically neutralized radiation except that the respectively associated waves are totally in phase so as to produce total constructive interference, and total reinforcement of the respectively associated oscillatorily time-varying electromagnetic fields which are produced by the hypothetical beam. Wherein, in the latter case, the measurement of the time-averaged energy flux density of the hypothetical beam is accomplished with the application of an electromagnetic-based detector by way of electromagnetic interaction.

Moreover, note that radiation comprised in the neutralized beam comprises "particles" (e.g., photons or electrons comprising total energy and momentum) which are associated with the waves, wherein the waves experience superposition and interference, not the particles, and the radiation is not destroyed by destructive interference in agreement with the laws of the conservation of energy and momentum.

FIG. (1') is a somewhat detailed illustration of one version of the preferred embodiment which is illustrated in FIG. (1). Wherein, apparatus (2') (which is grouped with a dashed rectangle) is a top view of one version of apparatus (2) (which is illustrated in FIG. (1), and respectively comprises a version of a Michelson interferometer.

In which case, in FIG. (1'), source (3), e.g., a laser, produces a beam of electromagnetically intense, coherent, forward propagating radiation, e.g., a collimated laser beam, which is coherently transmitted by the air (6') to a plane beam splitter (7) (e.g., a partly transmitting and partly reflecting mirror), and then is divided (i.e., partly transmitted and partly reflected) by beam splitter (7) so as to produce a first transmitted intense coherent beam fraction and a first reflected intense coherent beam fraction. Then, the first transmitted beam fraction is coherently transmitted by the air (6') to the stationary totally reflecting retroreflector (9), and the first reflected beam fraction is coherently transmitted by the air (6') to the movable totally reflecting retroreflector (11). Then, retroreflector (9) totally reflects the first transmitted beam fraction in a coherent manner so that the first transmitted beam fraction is then coherently transmitted by the air (6') back to beam splitter (7), which then divides the first transmitted beam fraction so as to produce a second transmitted intense coherent beam fraction which is transmitted towards absorber (13), and so as to also produce a second reflected intense coherent beam fraction which is reflected in a coherent manner towards target (8'). Also, retroreflector (11) totally reflects the first reflected beam fraction in a coherent manner so that the first reflected beam fraction is then coherently transmitted by the air (6') back to beam splitter (7) which then divides the first reflected beam fraction so as to produce a third transmitted intense coherent beam fraction which is coherently transmitted towards target (8'), and so as to also produce a third reflected intense coherent beam fraction which is reflected towards absorber (13).

Wherein, the second reflected intense coherent beam fraction and the third transmitted intense coherent beam fraction combine at beam splitter (i.e., now beam combiner) (7) after traveling different path lengths, such that the forward traveling waves, which are associated with these combined beam fractions, superimpose out of phase to an extent so as to produce destructive interference to an extent, and such that the associated electric and magnetic fields which are comprised in these combined beam fractions each cancel to a corresponding extent. Thus, the second reflected beam fraction and the third transmitted beam fraction combine to produce a beam of electromagnetically neutralized radiation (4'). (Also, similarly, the second transmitted beam fraction and the third reflected beam fraction combine at beam splitter, i.e., beam combiner, 7 so as to produce what is considered to be, in this particular example, an extraneous beam of electromagnetically neutralized radiation which is transmitted to absorber 13. Note that absorber 13 can absorb the extraneous beam of electromagnetically neutralized radiation by incoherently scattering the extraneous beam with incoherently scattering apparatus so as to produce a resulting beam of electromagnetically intense radiation, and then, in due course, electromagnetically absorbing the resulting beam of electromagnetically intense radiation with absorptive apparatus by way of electromagnetic interaction.)

Next, the beam of electromagnetically neutralized radiation (4') is coherently transmitted by the air (6') to coherent transmission apparatus (6"), e.g., air. Then, finally, electromagnetically neutralized beam (4') is coherent transmitted by coherent transmission apparatus (6") to target (8').

Wherein, the adverse electromagnetic interaction of neutralized beam (4') with electromagnetically intense entities (e.g., electrically charged particles) comprised in coherent transmission apparatus (6") is eliminated in direct proportion to the time-averaged energy flux density which is eliminated from beam (4') during transmission in apparatus (6"). While, the adverse electromagnetic effects of transmitting energy are eliminated in direct proportion to the extent to which such adverse electromagnetic interaction is eliminated.

FIG. (2) illustrates a side view of a somewhat more specific preferred embodiment which is applied for the transmission and subsequent utilization of energy in an effective manner. Steps (1), (2), and (3) which are applied in the preferred embodiment which pertains to FIG. (1) are, in general, applicable in the preferred embodiment which is illustrated in FIG. (2) except that, more specifically, apparatus (2a) produces a beam of totally electromagnetically neutralized radiation (4a) which is coherently transmitted by coherent transmission apparatus (6a) to target (8a), which then, in due course, utilizes the transmitted beam. In effect, the adverse electromagnetic interaction of neutralized beam (4a) with electromagnetically intense entities (e.g., electrically charged particles) comprised in coherent transmission apparatus (6a) is totally eliminated in direct proportion to (i.e., in agreement with) the total electromagnetic neutralization of beam (4a) during transmission. Wherein, the adverse electromagnetic effects of transmitting energy are totally eliminated.

Figure 12A:
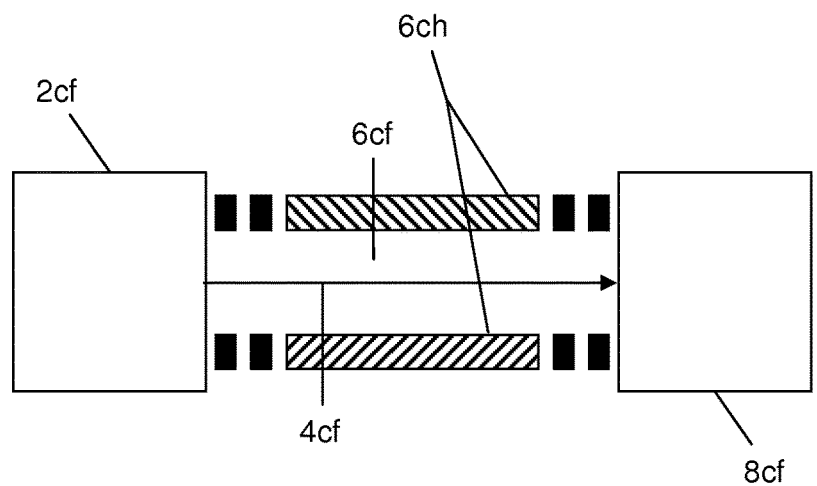
Figure 12B:
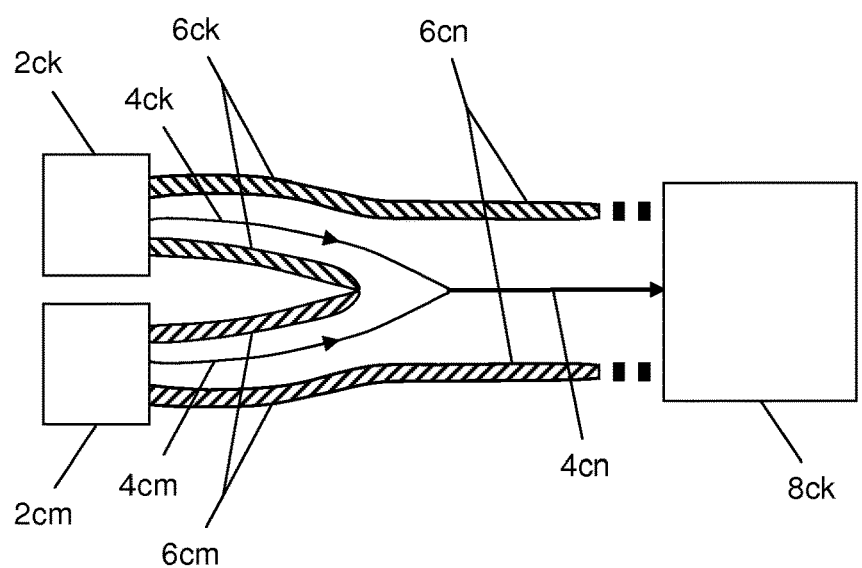
Figure 12C:
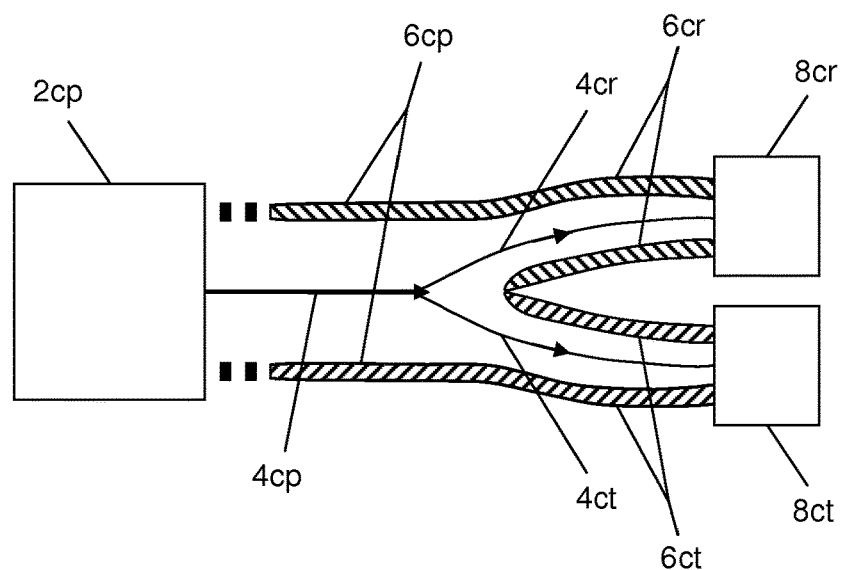
Figure 12D:
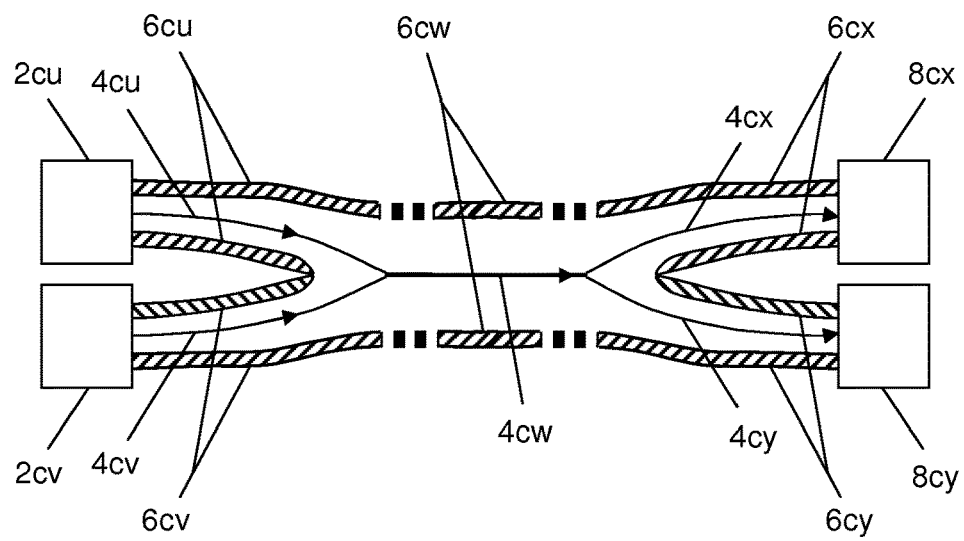

In the preferred embodiment which is illustrated in FIG. (2), coherent transmission processes involve potential-energy-based coherent transmission processes which include a quantum mechanical functional relation between the total energy comprised by the coherently transmitted electromagnetically neutralized radiation in beam (4a) and the potential energy comprised by coherent transmission apparatus (6a). (Refer to the preferred embodiment for power transmission which pertains to FIG. 12a and the preferred embodiment which applies an optical fiber for wireline communications for some details of some of the parameters of some example potential-energy-based coherent transmission media.)

Figure 2:
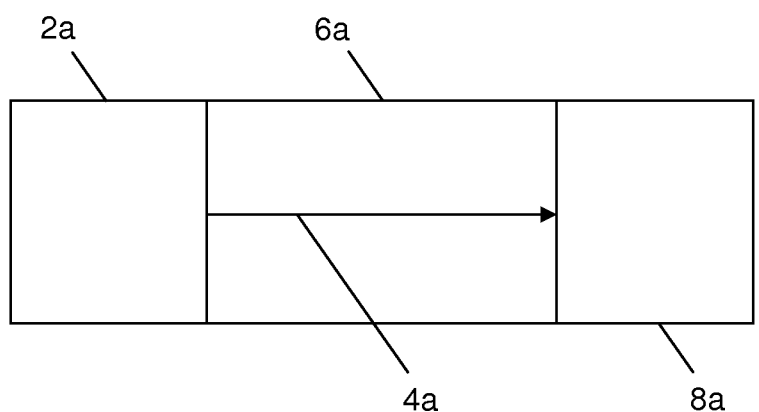

FIG. (2-a) illustrates the construction of a beam of totally electromagnetically neutralized quanta of electromagnetic radiation (4b) which is one version of beam (4a) (which is illustrated in FIG. 2). Wherein, FIG. (2-a) illustrates electromagnetically intense, coherent beam portions of radiation (10b) and (12b) which are aligned parallel to the given (t) axis along the directions of propagation (14b) and (20b), respectively. Beam portions (10b) and (12b) are associated with the linearly polarized, sinusoidally time-varying, forward traveling, transverse wave components (16b) and (22b), respectively, which are linearly polarized in the (t-y) plane, and are each associated with a respective linearly polarized, sinusoidally time-varying electric field component in the (t-y) plane. While, beam portions (10b) and (12b) are also associated with the linearly polarized, sinusoidally time-varying, forward traveling, transverse wave components (18b) and (24b), respectively, which are linearly polarized in a plane which is parallel to the given (t-x) plane, and are each associated with a respective linearly polarized, sinusoidally time-varying magnetic field component in a respective (t-x) plane.

FIG. (2-a) also illustrates the resultant beam (4b) aligned along the direction of propagation (26b) which is parallel to the given (t) axis. Wherein, beam (4b) is the result of the two combined beam portions (10b) and (12b).

Beam portions (10b) and (12b) are combined such that wave components (16b) and (22b), which comprise an equivalent amplitude and wavelength, are superimposed totally out of phase (i.e., 180 degrees out of phase as illustrated according to their alignments with respect to the given y-axis) so as to produce total destructive interference, and the total cancellation of the respectively associated electric field components; and such that wave components (18b) and (24b), which comprise an equivalent amplitude and wavelength, are superimposed totally out of phase so as to produce total destructive interference, and the total cancellation of the respectively associated magnetic field components. FIG. (2-a) furthermore illustrates the superposition resultant of zero magnitude (28b) (dashed line) which is associated with the resultant electromagnetic field of zero magnitude in beam (4b) along the direction of propagation (26b).

The beam of totally electromagnetically neutralized radiation (4b) comprises a time-averaged particle flux density of non-zero magnitude, and comprises a time-averaged energy flux density of zero magnitude. Thus, the radiation in beam (4b) is totally electromagnetically neutralized in direct proportion to (i.e., in agreement with) the total elimination of time-averaged energy flux density from beam (4b) (which is considered to include the total electric charge neutralization of the electrically charged particles in the totally electromagnetically neutralized beam in agreement with the corresponding total electromagnetic neutralization of the beam when a beam of totally electromagnetically neutralized electrically charged particles is applied). (Note that the description for the total electromagnetic neutralization of quanta of electromagnetic radiation herein is applicable to the total electromagnetic neutralization of the quanta of electromagnetic radiation which accompany (and are associated with) a beam of propagating electrically charged particles. While, the total electromagnetic neutralization of a beam of propagating electrically charged particles by the superposition of the waves (i.e., the de Broglie waves) which are associated with the propagating electrically charged particles per se can be described in analogous terms.)

FIG. (2-b) illustrates a pulsed beam of totally electromagnetically neutralized quanta of electromagnetic radiation (4c) which is another version of beam (4a) (which is illustrated in FIG. (2). Beam (4c) is a resultant beam which comprises two other combined coherent beam portions of radiation. The beam of totally electromagnetically neutralized radiation (4c), which is illustrated in FIG. (2-b), is different from the beam of totally electromagnetically neutralized radiation (4b), which is illustrated in FIG. (2-a), in that beam (4c) is a pulsed beam as illustrated by the three respectively comprised pulses (30c) and the spaces (32c) between them.

Pulsed beam (4c) comprises a time-averaged particle flux density of non-zero magnitude, and comprises a time-averaged energy flux density of zero magnitude. Thus, the radiation in beam (4c) is totally electromagnetically neutralized.

FIG. (2-c) illustrates an amplitude modulated (i.e., momentum amplitude modulated) pulsed beam of totally electromagnetically neutralized quanta of electromagnetic radiation (4d) which is yet another version of beam (4a) (which is illustrated in FIG. 2). Beam (4d) is a resultant beam which comprises still two other combined coherent beam portions of radiation.

The pulsed beam of totally electromagnetically neutralized radiation (4d), which is illustrated in FIG. (2-c), is different from the pulsed beam of totally electromagnetically neutralized radiation (4c), which is illustrated in FIG. (2-b), in that pulsed beam (4d) is amplitude modulated so as to be digitally encoded with binary data (i.e., here, binary digital data 101). Wherein, the (1) digits are each illustrated by one of the two relatively large pulses (30d) which each comprise a non-zero magnitude of time-averaged particle flux density which is significantly greater than the non-zero magnitude of time-averaged particle flux density of the smaller pulse (30e), which represents the digit (0), and is situated between the two relatively larger pulses (30d).

The beam of totally electromagnetically neutralized radiation (4d) comprises a time-averaged particle flux density of non-zero magnitude, and comprises a time-averaged energy flux density of zero magnitude. Thus, the radiation in beam (4d) is totally electromagnetically neutralized.

FIG. (3) illustrates a side view of another somewhat more specific preferred embodiment which is applied for the transmission and subsequent utilization of energy in an effective manner. Steps (1), (2), and (3) which are applied in the preferred embodiment which pertains to FIG. (1) are, in general, applicable in the preferred embodiment which is illustrated in FIG. (3) except that, more specifically, apparatus (2f) produces a beam of partly electromagnetically neutralized radiation (4f) which is coherently transmitted by coherent transmission apparatus (6f) to target (80, which, then, utilizes the transmitted beam. In effect, the adverse electromagnetic interaction of neutralized beam (4f) with electromagnetically intense entities (e.g., electrically charged particles) comprised in coherent transmission apparatus (60 is eliminated in direct proportion to the time-averaged energy flux density which is eliminated from beam (40 during transmission. Wherein, the adverse electromagnetic effects of transmitting energy are eliminated in direct proportion to the extent to which such adverse electromagnetic interaction is eliminated. (Note that, conversely, the beam of partly electromagnetically neutralized radiation 4f can adversely electromagnetically interact with electromagnetically intense entities, e.g., electrically charged particles, comprised in coherent transmission apparatus 6f in direct proportion to the extent to which the associated forward traveling waves partly constructively interfere and the associated oscillatorily time-varying electromagnetic fields partly reinforce, i.e., in direct proportion to the time-averaged energy flux density which remains in beam 4f during transmission. Thus, adverse electromagnetic effects of transmitting energy can be present in this case in direct proportion to the extent to which such adverse electromagnetic interaction is present.)

In the preferred embodiment which is illustrated in FIG. (3), the beam of partly electromagnetically neutralized radiation (4f) is coherently transmitted by coherent transmission processes which include the following: a) potential-energy-based coherent transmission processes which involve a quantum mechanical functional relation between the total energy comprised by the coherently transmitted partly electromagnetically neutralized radiation in beam (40 and the potential energy comprised by coherent transmission apparatus (60; and b) electromagnetic-based coherent transmission processes which involve electromagnetic interaction between the coherently transmitted partly electromagnetically intense radiation comprised in beam (40 and electromagnetically intense entities (e.g., electrically charged particles) comprised in coherent transmission apparatus (60. (Refer to the preferred embodiment for power transmission which pertains to FIG. 12a and the preferred embodiment which applies an optical fiber for wireline communications for some details of some of the parameters of some example potential-energy-based and electromagnetic-based coherent transmission media.)

Figure 3:
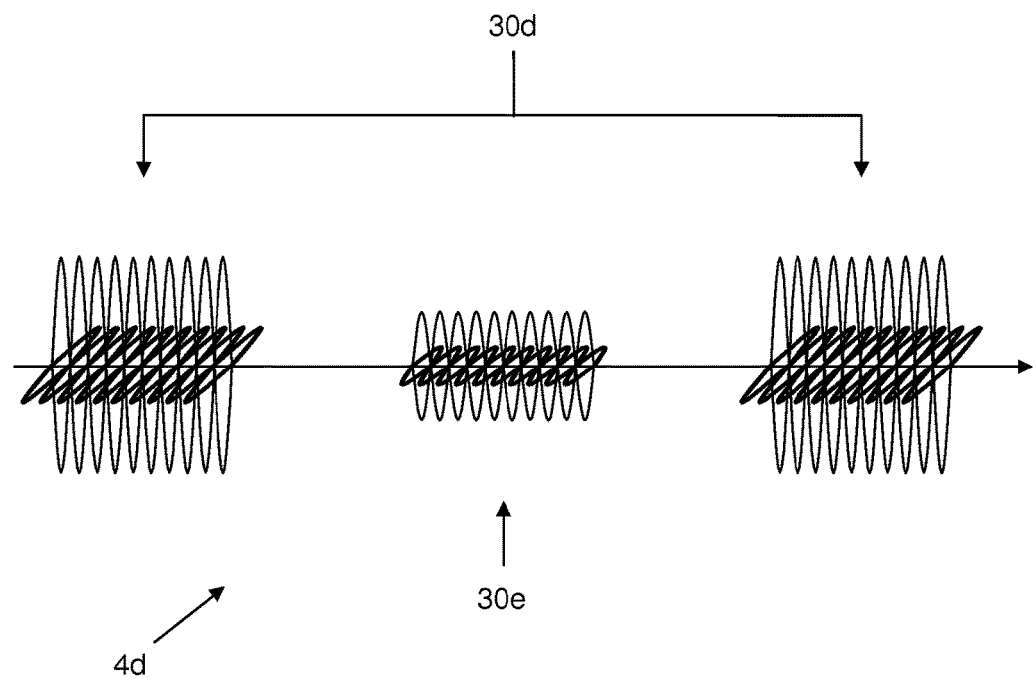
Figure 3:
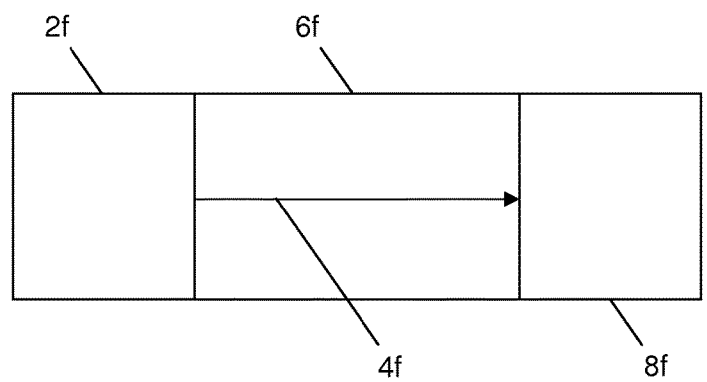

FIG. (3-a) illustrates the construction of a beam of partly electromagnetically neutralized quanta of electromagnetic radiation (4h) which is one version of beam (4f) (which is illustrated in FIG. 3). The beam of partly electromagnetically neutralized radiation (4h), which is illustrated in FIG. (3-a), is different from the beam of totally electromagnetically neutralized radiation (4b), which is illustrated in FIG. (2-a), in that beam (4h) is produced by linearly polarized, sinusoidally time-varying electromagnetic wave components which are superimposed only partly out of phase.

Wherein, FIG. (3-a) illustrates electromagnetically intense, coherent beam portions of radiation (10h) and (12h) which are aligned parallel to the given (t) axis along the directions of propagation (14h) and (20h), respectively. Beam portions (10h) and (12h) are associated with the linearly polarized, sinusoidally time-varying, forward traveling, transverse wave components (16h) and (22h), respectively, which are linearly polarized in the (t-y) plane, and are each associated with a respective linearly polarized, sinusoidally time-varying electric field component in the (t-y) plane. While, beam portions (10h) and (12h) are also associated with the linearly polarized, sinusoidally time-varying, forward traveling, transverse wave components (18h) and (24h), respectively, which are linearly polarized in a plane which is parallel to the given (t-x) plane, and are each associated with a respective linearly polarized, sinusoidally time-varying magnetic field component in a respective (t-x) plane.

FIG. (3-a) furthermore illustrates the resultant beam (4h) aligned along the direction of propagation (26h) which is parallel to the given (t) axis. Wherein, beam (4h) is the result of the two combined beam portions (10h) and (12h).

Beam portions (10h) and (12h) are combined such that wave components (16h) and (22h), which comprise an equivalent amplitude and wavelength, are superimposed partly out of phase (i.e., out of phase within an open interval between zero degrees out of phase and 180 degrees out of phase as illustrated according to their alignments with respect to the given y-axis) so as to produce partial destructive interference, and partial cancellation of the respectively associated electric field components; and such that wave components (18h) and (24h), which comprise an equivalent amplitude and wavelength, are superimposed partly out of phase (i.e., out of phase to the same extent as wave components 16h and 22h are out of phase) so as to produce partial destructive interference, and partial cancellation of the respectively associated magnetic field components.

The beam of partly electromagnetically neutralized radiation (4h) is associated with a superposition resultant, linearly polarized, sinusoidally time-varying, forward traveling, transverse wave (28h) which comprises the superposition resultant, linearly polarized, sinusoidally time-varying, forward traveling, transverse wave component (34h), which is linearly polarized in the (t-y) plane, and is associated with a resultant, linearly polarized, sinusoidally time-varying electric field component (in the t-y plane); and wave (28h) also comprises the superposition resultant, linearly polarized, sinusoidally time-varying, forward traveling, transverse wave component (36h), which is linearly polarized in a plane which is parallel to the (t-x) plane, and is associated with a resultant, linearly polarized, sinusoidally time-varying magnetic field component in the respective (t-x) plane.

The beam of partly electromagnetically neutralized radiation (4h) comprises a time-averaged particle flux density of non-zero magnitude, and also comprises a time-averaged energy flux density of non-zero magnitude. In which case, the radiation in beam (4h) is electromagnetically neutralized in direct proportion to the time-averaged energy flux density which is eliminated from beam (4h), and is electromagnetically intense in direct proportion to the time-averaged energy flux density which remains in beam (4h) (wherein the partial electromagnetic neutralization of a beam is considered to include the partial electric charge neutralization of the electrically charged particles in the beam in agreement with the corresponding partial electromagnetic neutralization of the beam when a beam of partly electromagnetically neutralized electrically charged particles is applied). (Note that the description for the partial electromagnetic neutralization of quanta of electromagnetic radiation herein is applicable to the partial electromagnetic neutralization of the quanta of electromagnetic radiation which accompany (and are associated with) a beam of propagating electrically charged particles. While, the partial electromagnetic neutralization of a beam of propagating electrically charged particles by the superposition of the waves (i.e., the de Broglie waves) which are associated with the propagating electrically charged particles per se can be described in analogous terms. Also, note that, as other examples, a beam of partly electromagnetically neutralized quanta of electromagnetic radiation can be produced by a beam which is associated with two wave components which comprise different amplitudes and equivalent wavelengths, and are superimposed totally or partly out of phase.)

FIG. (3-b) illustrates a pulsed beam of partly electromagnetically neutralized quanta of electromagnetic radiation (4k) which is another version of beam (4f) (which is illustrated in FIG. 3). Beam (4k) is a resultant beam which comprises two other combined coherent beam portions of radiation. The beam of partly electromagnetically neutralized radiation (4k), which is illustrated in FIG. (3-b), is different from the beam of partly electromagnetically neutralized radiation (4h), which is illustrated in FIG. (3-a), in that beam (4k) is a pulsed beam as illustrated by the three respectively comprised pulses (30k) and the spaces (32k) between them.

Pulsed beam (4k) comprises a time-averaged particle flux density of non-zero magnitude, and comprises a time-averaged energy flux density of non-zero magnitude. In which case, the radiation in beam (4k) is electromagnetically neutralized in direct proportion to the time-averaged energy flux density which is eliminated from beam (4k), and is electromagnetically intense in direct proportion to the time-averaged energy flux density which remains in beam (4k).

The amplitudes of the superposition resultant waves in the (t-y) plane which are associated with the resultant, linearly polarized, sinusoidally time-varying electric field components of pulses (30k) comprised in beam (4k) would be less than the corresponding amplitudes of the superposition resultant waves which would be associated with the resultant, linearly polarized, sinusoidally time-varying electric field components of the pulses of a hypothetical beam of totally electromagnetically intense radiation which would be equivalent to beam (4k) with the exception that it would be produced with total constructive interference of respectively associated waves, and total reinforcement of the respectively associated electromagnetic fields which are produced by the hypothetical beam. Wherein, as a reference, the amplitudes of the superposition resultant waves of pulses (30k) would be less than the corresponding amplitudes of the superposition resultant waves of the pulses of the hypothetical beam which would be tangent to dashed lines (+y") and (−y") which are illustrated in FIG. (3-b). While, the equivalent would be the case for the amplitudes of the superposition resultant waves which are associated with the resultant, linearly polarized, sinusoidally time-varying magnetic field components of beam (4k) in the (t-x) plane as regards to such a hypothetical beam.

FIG. (3-c) illustrates an amplitude modulated (i.e., momentum amplitude modulated) pulsed beam of partly electromagnetically neutralized quanta of electromagnetic radiation (4m) which is yet another version of beam (4f) (which is illustrated in FIG. 3). Beam (4m) is a resultant beam which comprises still two other combined coherent beam portions of radiation.

The pulsed beam of partly electromagnetically neutralized radiation (4m), which is illustrated in FIG. (3-c), is different from the pulsed beam of partly electromagnetically neutralized radiation (4k), which is illustrated in FIG. (3-b), in that pulsed beam (4m) is amplitude modulated so as to be digitally encoded with binary data (i.e., here, binary digital data 101). Wherein, the (1) digits are each illustrated by one of the two relatively large pulses (30m) which each comprise a non-zero magnitude of time-averaged particle flux density which is significantly greater than the time-averaged particle flux density of the smaller pulse (30n), which represents the digit (0), and is situated between the two relatively larger pulses (30m).

Beam (4m) comprises a time-averaged particle flux density of non-zero magnitude, and comprises a time-averaged energy flux density of non-zero magnitude. In which case, the radiation in the beam of partly electromagnetically neutralized radiation (4m), which is illustrated in FIG. (3-c), is electromagnetically neutralized in direct proportion to the time-averaged energy flux density which is eliminated from beam (4m), and is electromagnetically intense in direct proportion to the time-averaged energy flux density which remains in beam (4m).

The amplitudes of the superposition resultant waves of the larger pulses (30m) and the amplitudes of the superposition resultant wave of the smaller pulse (30n) in the (t-y) plane, which are associated with the resultant, linearly polarized, sinusoidally time-varying electric field components of beam (4m), would be less than the corresponding amplitudes of the superposition resultant waves which would be associated with the resultant, linearly polarized, sinusoidally time-varying electric field components of the pulses of a hypothetical beam of totally electromagnetically intense radiation which would be equivalent to beam (4m) with the exception that it would be produced with total constructive interference of respectively associated waves, and total reinforcement of the respectively associated electromagnetic fields which are produced by the hypothetical beam. Wherein, as references, the amplitudes of the superposition resultant waves of the larger pulses (30m) would be less than the corresponding amplitudes of the superposition resultant waves of the larger pulses of the hypothetical beam which would be tangent to dashed lines (+y") and (−y") which are illustrated in FIG. (3-c), and the amplitudes of the superposition resultant wave of the smaller pulse (30n) would be less than the corresponding amplitudes of the superposition resultant wave of the smaller pulse of the hypothetical beam which would be tangent to dashed lines (+y') and (−y') which are also illustrated in FIG. (3-c). While, the equivalent would be the case for the amplitudes of the superposition resultant waves which are associated with the resultant, linearly polarized, sinusoidally time-varying magnetic field components of beam (4m) in the (t-x) plane as regards to such a hypothetical beam.

FIG. (4) illustrates a side view of a generalized preferred embodiment of the present invention which is applied in an effective manner for the transmission and subsequent utilization of a beam of electromagnetically neutralized radiation comprising momentum. Steps (1), (2), and (3) which are applied in the preferred embodiments which pertain to FIGS. (1), (2), and (3) are, in general, applicable in the preferred embodiment which is illustrated in FIG. (4).

Wherein, in the preferred embodiment which is illustrated in FIG. (4), apparatus (2p) produces a beam of electromagnetically neutralized radiation (4p) comprising a least one significant change in momentum (i.e., at least one transducible change in momentum). In which case, for example, beam (4p) can comprise a continuous beam of electromagnetically neutralized radiation with a leading edge, or also a trailing edge, as illustrated in the latter case, for example, in FIGS. (2-a) and (3-a); or beam (4p) can comprise a pulsed beam of electromagnetically neutralized radiation as illustrated, for example, in FIGS. (2-b), (2-c), (3-b), and (3-c). Nevertheless, then, beam (4p) is coherently transmitted by coherent transmission apparatus (6p) (e.g., air filled tubing, optical fiber, or air) to a targeted momentum-based utilization apparatus (38p) (e.g., a pressure transducer).

Wherein, the adverse electromagnetic interaction of neutralized beam (4p) with electromagnetically intense entities (e.g., electrically charged particles) comprised in coherent transmission apparatus (6p) is eliminated in direct proportion to the time-averaged energy flux density which is eliminated from beam (4p) during transmission. In which case, the adverse electromagnetic effects of transmitting energy for the respective application (e.g., adverse electromagnetic-based scattering, absorption, and corresponding adverse power attenuation of beam 4p during transmission) are eliminated in direct proportion to the extent to which such adverse electromagnetic interaction is eliminated.

Then, in the preferred embodiment which is illustrated in FIG. (4), the momentum comprised by the coherently transmitted beam of electromagnetically neutralized radiation (4p) is utilized by utilization apparatus (38p). Wherein, coherently transmitted particle beam (4p) (which comprises electromagnetically neutralized quanta of electromagnetic radiation or electromagnetically neutralized electrically charged particles) imparts momentum, e.g., by reflection, upon apparatus (38p) which utilizes the applied momentum to produce the result of the respective embodiment, e.g., a targeted pressure transducer can utilize the applied momentum in the form of applied pressure to produce electrical voltage which can then be used for supplying power to a load; or a pressure transducer can utilize the applied pressure to produce electrical voltage comprising retrievable data which can then be used for communications when the momentum comprised by the neutralized particle beam is modulated so as to be encoded with data as, for example, each of the beams of electromagnetically neutralized radiation which are illustrated in FIGS. (2-c) and (3-c) is modulated so as to be encoded with binary data.

Note that other than the utilization of voltage, a resulting current can be utilized from, for example, a piezoelectric pressure transducer to produce the result of the respective application of the present invention. Also, note that coherently transmitted particle beam 4p imparts momentum, i.e., applies pressure, upon a pressure transducer in accordance with the law of the conservation of momentum. In which case, momentum, which is comprised by the particles in the neutralized beam, is applied to the pressure transducer by a momentum vector which is equal in magnitude and opposite in direction to the change of the momentum vector of the incident beam of electromagnetically neutralized radiation.

In other preferred embodiments, the process described in the preferred embodiment which pertains to FIG. (4) is repeated at least once (with respect to the given example in which a targeted pressure transducer is applied). Wherein, in each such embodiment, the impinging electromagnetically neutralized particle beam, which comprises electromagnetically neutralized quanta of electromagnetic radiation or electromagnetically neutralized electrically charged particles, is coherently reflected from the reflective outer surface of a respectively implemented pressure transducer, and then coherently transmitted through coherent transmission apparatus to at least one other pressure transducer (and applies pressure thereon) and/or is reflected back to the first pressure transducer (upon which the neutralized particle beam would apply pressure) so as to produce at least one additional electrical voltage. In which case, upon repetition of the process described in the preferred embodiment which pertains to FIG. (4), but as modified herein, a plurality of electrical voltages are produced during an interval of time to produce the overall net result of the present embodiment, e.g., such that a plurality of electrical voltages are produced for supplying power to more than one load and/or for supplying more power to one load, or such that data encoded in such electrical voltages are retrieved over an interval of time, e.g., for data buffering or data caching.

FIG. (5) illustrates a side view of another generalized preferred embodiment of the present invention which is applied for the transmission and subsequent utilization of energy in an effective manner. Steps (1), (2), and (3) which are applied in the preferred embodiment which pertains to FIG. (3) are, in general, applicable in the preferred embodiment which is illustrated in FIG. (5).

Wherein, in the preferred embodiment which is illustrated in FIG. (5), apparatus (2r) produces a beam of partly electromagnetically neutralized radiation (4r) which is coherently transmitted by coherent transmission apparatus (6r) (e.g., air filled tubing, optical fiber, or air) to targeted electromagnetic-based utilization apparatus (40r) (e.g., a detector comprising a photodetector or a particle detector). In which case, the adverse electromagnetic interaction of the beam of partly electromagnetically neutralized radiation (4r) with electromagnetically intense entities (e.g., electrically charged particles) comprised in coherent transmission apparatus (6r) is eliminated in direct proportion to the time-averaged energy flux density which is eliminated from beam (4r) during transmission. Wherein, the adverse electromagnetic effects of transmitting energy for the respective application are eliminated in direct proportion to the extent to which such adverse electromagnetic interaction is eliminated.

Then, in the preferred embodiment which is illustrated in FIG. (5), the coherently transmitted beam of partly electromagnetically neutralized radiation (4r) is utilized by electromagnetic-based utilization apparatus (40r) in order to produce the result of the respective embodiment (e.g., a photodetector or a particle detector utilizes transmitted beam 4r to produce electrical output, e.g., electric voltage or current output, when a beam of partly electromagnetically neutralized quanta of electromagnetic radiation or a beam of partly electromagnetically neutralized electrically charged particles is applied, respectively). Wherein, in this case, electromagnetically intense entities (e.g., electrically charged particles) comprised in electromagnetic-based utilizing apparatus (40r) utilize transmitted beam (4r) by way of electromagnetic interaction.

FIG. (6) illustrates a side view of a generalized conditional preferred embodiment of the present invention which is applied for the transmission and subsequent utilization of energy in an effective manner. In particular, the preferred embodiment which is illustrated in FIG. (6) is different in that it applies target (8x) which comprises incoherently scattering and transmitting apparatus (50x), and a separate posteriorly located electromagnetic-based utilization apparatus (40x) (e.g., a detector comprising a photodetector or a particle detector). In this case, steps (1), (2), and (3) which are applied in the preferred embodiments which pertain to FIGS. (1), (2), and (3) are, in general, applicable in the preferred embodiment which is illustrated in FIG. (6), yet with the addition of a step.

Accordingly, in the preferred embodiment which is illustrated in FIG. (6), apparatus (2x) produces a beam of electromagnetically neutralized radiation (4x) which is coherently transmitted by coherent transmission apparatus (6x) (e.g., air filled tubing, optical fiber, or air) to target (8x). Wherein, the adverse electromagnetic interaction of neutralized beam (4x) with electromagnetically intense entities (e.g., electrically charged particles) comprised in coherent transmission apparatus (6x) is eliminated in direct proportion to the time-averaged energy flux density which is eliminated from beam (4x) during transmission. In which case, the adverse electromagnetic effects of transmitting energy for the respective application are eliminated in direct proportion to the extent to which such adverse electromagnetic interaction is eliminated.

Then, in addition, electromagnetically neutralized beam (4x) is incoherently scattered to an extent by incoherently scattering apparatus in apparatus (50x) so as to produce a beam of electromagnetically intense radiation (52x) comprising radiation which is associated with randomly distributed waves with random relative phases which neither superimpose nor interfere, such that the electromagnetic field intensities, which are associated with the waves, add, and produce a significant non-zero magnitude of time-averaged energy flux density in apparatus (50x), i.e., a beam of electromagnetically intense radiation is produced comprising the following: a) an incoherent beam of radiation which is produced by incoherent scattering, or also b) any transmitted remaining portion of a beam of partly electromagnetically neutralized radiation which is not incoherently scattered if a beam of partly electromagnetically neutralized radiation is applied. Also in this step, the beam of electromagnetically intense radiation (52x) is transmitted by transmission apparatus comprised in apparatus (50x) (e.g., transmission apparatus comprising forward transmitting, incoherently scattering media) (or also transmitted by transmission media comprised in electromagnetic-based utilization apparatus 40x) to electromagnetically intense entities (e.g., electrically charged particles) comprised in apparatus (40x).

Then, energy is transferred from the transmitted beam of electromagnetically intense radiation (52x) to utilization apparatus (40x) in order to produce the result of the respective embodiment (e.g., a photodetector or a particle detector utilizes the transmitted beam of electromagnetically intense radiation 52x to produce electrical output, e.g., electric voltage or current output, when a beam of electromagnetically intense quanta of electromagnetic radiation or a beam of electromagnetically intense electrically charged particles is involved, respectively). Wherein, electromagnetically intense entities (e.g., electrically charged particles) comprised in apparatus (40x) utilize the transmitted beam of electromagnetically intense radiation by way of electromagnetic interaction. Note that, in another embodiment, energy can be transferred from a transmitted beam of electromagnetically intense radiation, by way of electromagnetic interaction, to an electromagnetic-based utilization apparatus in a different sort of target in order to produce a different result in the form of, for example, pertinent heat motion in, and/or pertinent ionization and/or pertinent dissociation of, such a utilization apparatus.

If a beam of totally electromagnetically neutralized radiation is applied, then the preferred embodiment which is illustrated in FIG. (6) can apply a step comprising potential-energy-based or also electromagnetic-based incoherent scattering, and, in due course, a step for the utilization of electromagnetically intense radiation. In which case, apparatus (50x) in the preferred embodiment which is illustrated in FIG. (6) would comprise potential-energy-based or also electromagnetic-based incoherently scattering apparatus.

However, if a beam of partly electromagnetically neutralized radiation is applied, then the preferred embodiment which is illustrated in FIG. (6) can apply a step comprising potential-energy-based and/or electromagnetic-based incoherent scattering, and, in due course, a step for the utilization of electromagnetically intense radiation. Wherein, in this case, apparatus (50x) would comprise potential-energy-based and/or electromagnetic-based incoherently scattering apparatus.

In these cases, potential-energy-based incoherently scattering apparatus can comprise an irregularly ordered distribution of particles which each comprise the following: a) a size and spacing which are each comparable to, or significantly larger than, the wavelengths of the waves which are associated with the radiation which is incoherently scattered from the beam of electromagnetically neutralized radiation (4x); and b) potential energy which changes significantly relative to the potential energy of its respective surroundings, and relative to the total energy comprised by the respective incoherently scattered radiation. Wherein, potential-energy-based incoherent scattering processes (e.g., irregular reflections or also irregular refractions by an irregularly ordered distribution of irregularly shaped particles) involve a quantum mechanical functional relation between the total energy comprised by the respective incoherently scattered radiation and the potential energy comprised by potential-energy-based incoherently scattering apparatus.

While, electromagnetic-based incoherently scattering apparatus can comprise an irregularly ordered distribution of electromagnetically intense entities (e.g., an irregularly ordered distribution of static particles comprising atoms and/or molecules which comprise electrically charged particles) which each comprise spacing which is significantly larger than the wavelengths of the waves which are associated with the respective incoherently scattered radiation. In which case, electromagnetic-based incoherent scattering processes would involve electromagnetic interaction (e.g., would involve incoherent reradiation scattering if electromagnetically intense quanta of electromagnetic radiation are involved; or would involve incoherent scattering due to Coulomb force based collisions if electromagnetically intense electrically charged particles are involved).

Note that if a beam of totally electromagnetically neutralized radiation is applied in the preferred embodiment which is illustrated in FIG. (6), then, for all practical purposes, the onset of electromagnetic-based incoherent scattering of electromagnetically intense radiation by electromagnetic-based incoherently scattering apparatus would occur dependent upon the onset of the production of electromagnetically intense radiation by potential-energy-based incoherent scattering. However, if a beam of partly electromagnetically neutralized radiation is applied in the preferred embodiment which is illustrated in FIG. (6), then the onset of electromagnetic-based incoherent scattering of electromagnetically intense radiation by electromagnetic-based incoherently scattering apparatus would occur independent of the onset of the production of electromagnetically intense radiation by potential-energy-based incoherent scattering. This would be the case since a beam of partly electromagnetically neutralized radiation is already partly electromagnetically intense due to partial constructive interference of associated waves and partial reinforcement of respectively associated electromagnetic fields.

Figure 10A:
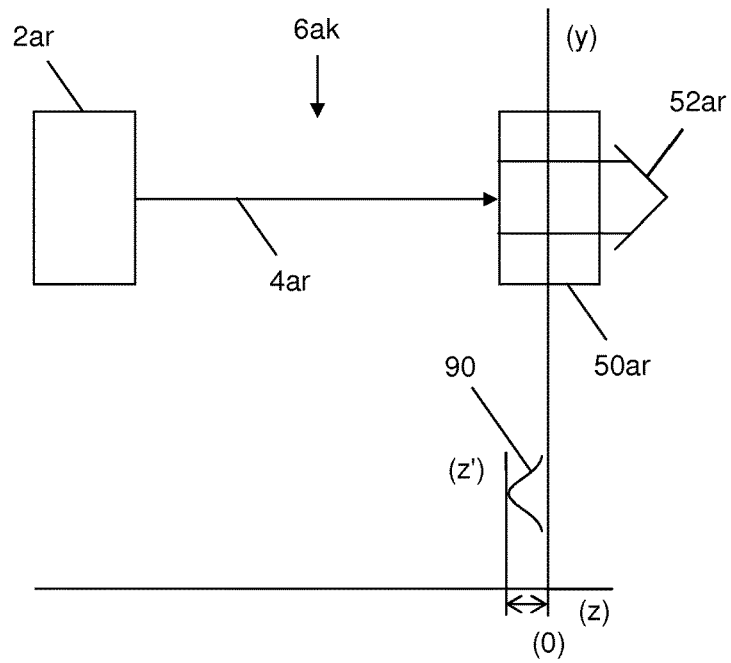
Figure 10B:
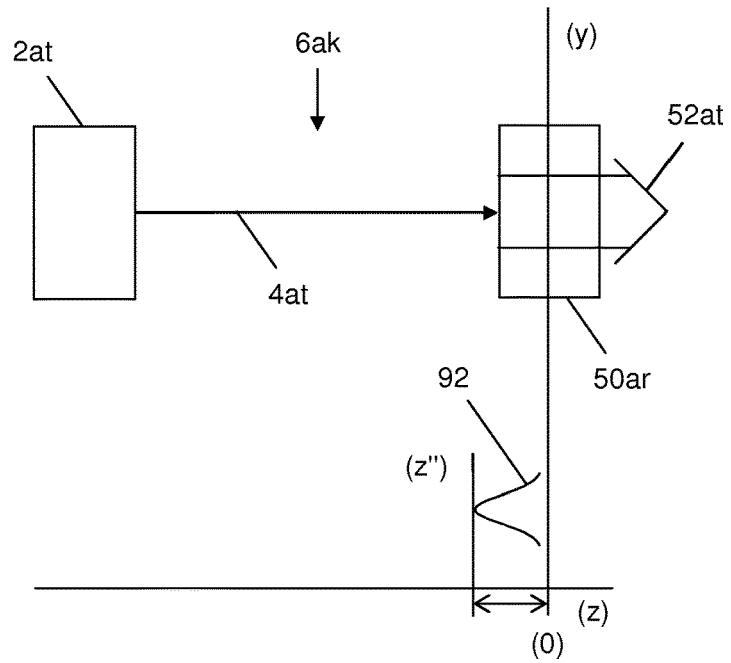
Figure 11A:
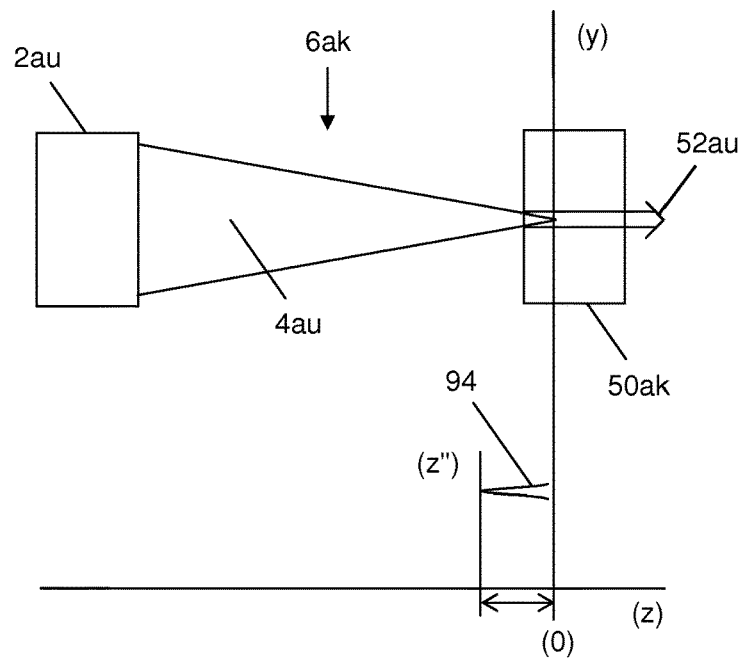
Figure 11B:
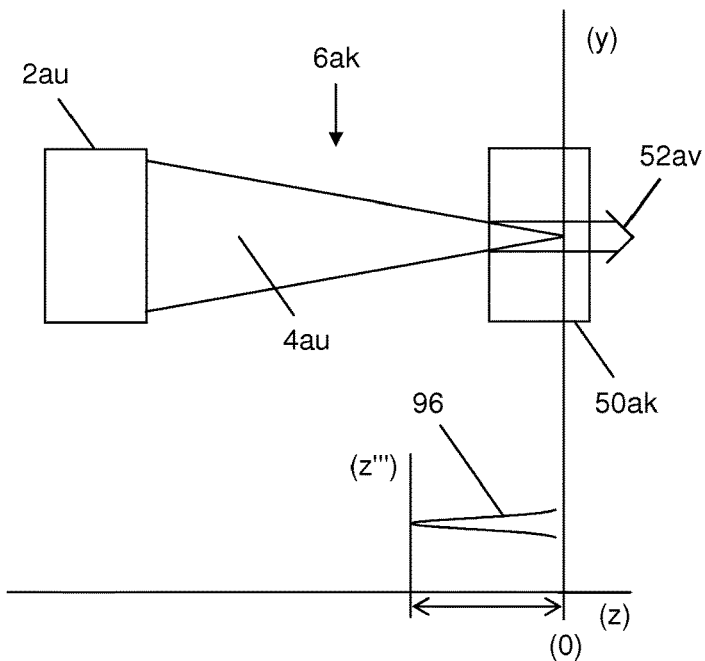

Also, note that the time-averaged energy flux density comprised by a given beam of partly electromagnetically neutralized radiation which is applied in an embodiment is considered to facilitate electromagnetic-based incoherent scattering of the given beam of partly electromagnetically neutralized radiation by electromagnetic-based incoherently scattering apparatus in direct proportion to the time-averaged energy flux density comprised in the respectively applied beam of partly electromagnetically neutralized radiation. (Refer to the embodiments which pertain to FIGS. 10a and 10b which regard one aspect of the significance of adjusting the time-averaged energy flux density of a beam of electromagnetically neutralized radiation which is applied in certain embodiments of the present invention.)

Furthermore, note that in the method described hereinbefore, the beam of electromagnetically intense radiation which is produced by incoherent scattering is considered to comprise a time-averaged energy flux density which is greater than the time-averaged energy flux density which is comprised by the beam of electromagnetically neutralized radiation from which it is produced. Moreover, note that, in general, in the present invention herein, electromagnetically intense radiation is considered to be radiation which is associated with a non-zero time-averaged energy flux density, such that electromagnetically intense radiation is considered, on average over time, totally electromagnetically intense as follows: a) if it is propagating by itself; b) if it is comprised in a beam of radiation produced with total incoherence; or, in terms of general principles, c) if it is comprised in a coherent beam of totally electromagnetically intense radiation which is produced with total constructive interference of forward traveling waves, and total reinforcement of associated time-varying electromagnetic fields. While, electromagnetically intense radiation is considered, on average over time, partly electromagnetically intense if it is comprised in a coherent beam of partly electromagnetically neutralized radiation which is produced with partial destructive interference of forward traveling waves, and partial cancellation of associated time-varying electromagnetic fields; and produced with partial constructive interference of forward traveling waves, and partial reinforcement of associated time-varying electromagnetic fields.

FIG. (7) illustrates a side view of yet another generalized preferred embodiment of the present invention which is applied for the transmission and subsequent utilization of energy in an effective manner. The steps which are applied in the preferred embodiment which pertains to FIG. (6) are, in general, applicable in the preferred embodiment which is illustrated in FIG. (7) except that incoherently scattering and transmitting apparatus are combined with electromagnetic-based utilization apparatus into one apparatus in target apparatus ($66ac$) which is illustrated in FIG. (7) (e.g., a detector comprising incoherently scattering and transmitting apparatus, and electromagnetic-based utilization apparatus).

In which case, in the preferred embodiment which is illustrated in FIG. (7), apparatus ($2ac$) produces a beam of electromagnetically neutralized radiation ($4ac$) which is coherently transmitted by coherent transmission apparatus ($6ac$) (e.g., air filled tubing, optical fiber, or air) to target ($66ac$). Wherein, the adverse electromagnetic interaction of neutralized beam ($4ac$) with electromagnetically intense entities (e.g., electrically charged particles) comprised in coherent transmission apparatus ($6ac$) is eliminated in direct proportion to the time-averaged energy flux density which is eliminated from beam ($4ac$) during transmission. In which case, the adverse electromagnetic effects of transmitting energy for the respective, application are eliminated in direct proportion to the extent to which such adverse electromagnetic interaction is eliminated.

Then, the coherently transmitted electromagnetically neutralized beam ($4ac$) is incoherently scattered to an extent by incoherently scattering apparatus comprised in target ($66ac$) so as to produce a beam of electromagnetically intense radiation ($68ac$) (which comprises a significant non-zero magnitude of time-averaged energy flux density) in target ($66ac$), i.e., a beam of electromagnetically intense radiation is produced comprising the following: a) an incoherent beam of radiation which is produced by incoherent scattering, or also b) any transmitted remaining portion of a beam of partly electromagnetically neutralized radiation which is not incoherently scattered if a beam of partly electromagnetically neutralized radiation is applied. Also in this step, transmission apparatus comprised in target ($66ac$) (e.g., transmission apparatus comprising forward transmitting, incoherently scattering media) transmits the beam of electromagnetically intense radiation ($68ac$) to electromagnetic-based utilization apparatus (comprising electromagnetically intense entities, e.g., electrically charged particles) also comprised in target ($66ac$).

Subsequently, energy is transferred from the transmitted beam of electromagnetically intense radiation ($68ac$) to the electromagnetic-based utilization apparatus comprised in target ($66ac$) in order to produce the result of the respective embodiment (e.g., a photodetector or a particle detector utilizes the transmitted beam of electromagnetically intense radiation $68ac$ to produce electrical output, e.g., electric voltage or current output, when a beam of electromagnetically intense quanta of electromagnetic radiation or a beam of electromagnetically intense electrically charged particles is involved, respectively). Wherein, electromagnetically intense entities (e.g., electrically charged particles) comprised in target ($66ac$) utilize the transmitted beam of electromagnetically intense radiation by way of electromagnetic interaction. Note that, in another embodiment, energy can be transferred from a transmitted beam of electromagnetically intense radiation, by way of electromagnetic interaction, to an electromagnetic-based utilization apparatus in a different sort of target in order to produce a different result in the form of, for example, pertinent heat motion in, and/or pertinent ionization and/or pertinent dissociation of, such a utilization apparatus.

Note that when electromagnetic-based incoherent scattering is applied, then electromagnetic-based incoherent scattering can include an extent of the electromagnetic-based utilization of the electromagnetically intense radiation as, for example, with the application of inelastic incoherent reradiation scattering if a beam of electromagnetically intense quanta of electromagnetic radiation is involved, e.g., with the application of incoherent Compton scattering if a beam of electromagnetically intense X-ray quanta of electromagnetic radiation is involved; or electromagnetic-based incoherent scattering can include an extent of the electromagnetic-based utilization of the electromagnetically intense radiation as, for example, with the application of incoherent scattering which is produced by inelastic Coulomb force based collisions if a beam of electromagnetically intense electrically charged particles is involved. Wherein, in such a case, a combined incoherent scattering and transmitting step (as with the application of electromagnetic-based forward transmitting, incoherently scattering media) can be combined to a respective extent with an electromagnetic-based utilization step.

Still yet another generalized preferred embodiment which is applied for the transmission and subsequent utilization of energy in an effective manner basically applies the steps which are applied in the preferred embodiment which pertains to FIG. (7). However, in this case, some respective modifications are employed which include one in which the incoherent scattering apparatus is comprised within, more specifically, the region of the focus of a respectively applied beam of electromagnetically neutralized electrically charged particles, and the target itself does not comprise incoherent scattering apparatus which can incoherently scatter a significant amount of electrically charged particles from the respectively applied beam of electromagnetically neutralized electrically charged particles.

Wherein, in this embodiment, first, apparatus produces a focused pulsed beam of electromagnetically neutralized electrically charged particles (e.g., a focused pulsed beam of electromagnetically neutralized electrons which are electric charge neutralized in direct proportion to the corresponding electromagnetic neutralization of the beam). Then, the neutralized particle beam is coherently transmitted by coherent transmission apparatus to the region of the beam's focus which is positioned in an electromagnetic-based utilization apparatus which comprises electromagnetically intense entities (e.g., electrically charged particles) and is comprised in the target apparatus. In which case, the adverse electromagnetic interaction of the electromagnetically neutralized beam with the coherent transmission apparatus, e.g., adverse Coulomb force based collisions, is eliminated in direct proportion to the time-averaged energy flux density which is eliminated from the neutralized beam during transmission, such that adverse electromagnetic effects of transmitting energy are eliminated in direct proportion to the extent to which such adverse electromagnetic interaction is eliminated.

Then, the focused neutralized particle beam is incoherently scattered to an extent by particles within the neutralized particle beam in the region of the beam's focus so as to produce a beam of electromagnetically intense electrically charged particles (comprising a significant non-zero magnitude of time-averaged energy flux density) in the electromagnetic-based utilization apparatus comprised in the target, i.e., a beam of electromagnetically intense electrically charged particles is produced comprising the following: a) an incoherent beam of electrically charged particles which is produced by incoherent scattering, or also b) any transmitted remaining portion of a beam of partly electromagnetically neutralized electrically charged particles which is not incoherently scattered if a beam of partly electromagnetically neutralized electrically charged particles is applied.

Here, if a focused beam of totally electromagnetically neutralized electrically charged particles is applied, then, for all practical purposes, incoherently scattering apparatus would initially comprise a potential-energy-based incoherently scattering medium which is produced by electric charge neutralized electrically charged particles within the neutralized particle beam which collectively produce significant incoherently scattering potential energy in the region of the beam's focus. However, if a focused beam of partly electromagnetically neutralized electrically charged particles is applied, then the incoherently scattering apparatus can initially comprise the electromagnetic-based incoherently scattering medium which is produced by electromagnetically intense electrically charged particles within the partly neutralized particle beam in the region of the beam's focus (which can produce Coulomb force based collisions), or also can comprise a potential-energy-based incoherently scattering medium which is produced by electrically charged particles within the partly neutralized particle beam in the region of the beam's focus.

In either case in which the application of a beam of totally electromagnetically neutralized electrically charged particles is involved, or a beam partly electromagnetically neutralized electrically charged particles is involved, other incoherent scattering apparatus can affect the incoherent scattering outcome of the applied beam of neutralized electrically charged particles including the following: 1a) potential-energy-based incoherent scattering apparatus which is produced as a consequence of the incoherent scattering of the neutralized particle beam in the region of the focus (i.e., any potential-energy-based incoherent scattering media which is produced by the aftermath of the incoherently scattered beam and which is produced by the aftermath of the targeted media); and/or 1b) electromagnetic-based incoherent scattering apparatus, which comprises incoherent electromagnetically intense electrically charged particles, which is produced as a consequence of the incoherent scattering of the neutralized particle beam in the region of the focus (i.e., any electromagnetic-based incoherent scattering media which is produced by the aftermath of the incoherently scattered beam and which is produced by the aftermath of the targeted media); and/or 2) any potential-energy-based and/or electromagnetic-based incoherent scattering media initially present in the target in the region of the beam's focus. (Note that such incoherent scattering processes would have the onset conditions for electromagnetic-based incoherent scattering which were described before in the preferred embodiment which pertains to FIG. 6.)

Nevertheless, the beam of electromagnetically intense electrically charged particles which is produced by incoherent scattering is then transmitted by the transmission apparatus within the target to electromagnetically intense entities (e.g., electrically charged particles) comprised in the electromagnetic-based utilization apparatus comprised in the target. Then, finally, energy is transferred from the transmitted beam of electromagnetically intense electrically charged particles to the electromagnetic-based utilization apparatus, which then utilizes the transmitted beam of electromagnetically intense electrically charged particles by way of electromagnetic interaction to produce the result of the respective embodiment, e.g., a target comprising a particle detector can utilize the transmitted intense beam to produce electrical output, e.g., electric voltage or current output; or energy can be transferred from a transmitted beam of electromagnetically intense electrically charged particles by way of inelastic Coulomb force based collisions to an electromagnetic-based utilization apparatus in a different sort of target in order to produce a different result in the form of, for example, pertinent ionization and/or pertinent dissociation of such a utilization apparatus.

In other embodiments of the present invention, a filtering apparatus is inserted between apparatus which is applied for producing a beam of electromagnetically neutralized radiation and coherent transmission apparatus. Wherein, the filtering apparatus coherently transmits the beam of electromagnetically neutralized radiation while eliminating any unwanted electromagnetically intense radiation which may be produced by systematic and/or random error from the electromagnetically neutralized beam. As examples:

a) A filtering apparatus can comprise coherently transmissive electromagnetically absorptive apparatus for an embodiment of the present invention which applies a beam of electromagnetically neutralized quanta of electromagnetic radiation or a beam of electromagnetically neutralized electrically charged particles, such that any unwanted electromagnetically intense radiation (which may be produced by systematic and/or random error) would be electromagnetically absorbed from a beam of otherwise totally electromagnetically neutralized radiation by such a filtering apparatus. For example: i) filtering apparatus can comprise coherently transmissive, selectively absorptive apparatus for absorbing unwanted relatively long wavelength electromagnetically intense quanta of electromagnetic radiation from a beam of otherwise totally electromagnetically neutralized relatively long wavelength quanta of electromagnetic radiation; ii) filtering apparatus can comprise coherently transmissive edge absorptive apparatus for absorbing unwanted relatively short wavelength electromagnetically intense quanta of electromagnetic radiation from a beam of otherwise totally electromagnetically neutralized short wavelength quanta of electromagnetic radiation, e.g., coherently transmissive k-edge absorptive apparatus for absorbing electromagnetically intense X-rays from a beam of otherwise totally electromagnetically neutralized X-ray wavelength quanta of electromagnetic radiation; or iii) filtering apparatus can comprise apparatus which coherently transmits a beam of electromagnetically neutralized electrically charged particles while also electromagnetically absorbing unwanted electromagnetically intense electrically charged particles from the beam of otherwise totally electromagnetically neutralized electrically charged particles;

b) A filtering apparatus can comprise a coherently transmissive limiter apparatus for an embodiment of the present invention which applies a beam of partly electromagnetically neutralized radiation, e.g., an optical limiter for an embodiment which applies a beam of partly electromagnetically neutralized optical wavelength quanta of electromagnetic radiation. Wherein, a beam of partly electromagnetically neutralized radiation which is applied in such an embodiment would be coherently transmitted, and its time-averaged energy flux density would be limited by the limiter filter. In which case, the limiter would eliminate unwanted time-averaged energy flux density (which is produced by systematic and/or random error) from the respectively applied beam of partly electromagnetically neutralized radiation while still coherently transmitting the remaining partly electromagnetically neutralized beam (which still comprises a certain desired amount of time-averaged energy flux density) towards a target; or c) A filtering apparatus can comprise a coherently transmissive electrostatic, magnetic, or electromagnetic deflecting apparatus in combination with electromagnetically absorptive apparatus. Wherein, such a filtering apparatus (e.g., comprising a coherently transmissive electrostatic field between two oppositely charged electrostatic plates situated on opposite sides of a neutralized beam) would deflect unwanted electromagnetically intense electrically charged particles (which are produced by systematic and/or random error) out of a beam of otherwise totally electromagnetically neutralized electrically charged particles towards the electromagnetically absorptive apparatus, which would then absorb the unwanted deflected electromagnetically intense electrically charged particles in due course by way of electromagnetic interaction.

In yet other embodiments of the present invention, shielding apparatus is applied to enclose an entire embodiment, or shielding apparatus is applied between only part of a given embodiment and any given material or space in order to shield the environment from electromagnetically neutralized and/or electromagnetically intense radiation which travels beyond a desired boundary around the embodiment of the present invention. For example, a shielding method can comprise the application of a potential energy barrier apparatus prior to such a boundary; or a shielding method can comprise steps prior to such a boundary which include the following: a) the step of incoherently scattering a transgressing beam of radiation, which comprises electromagnetically neutralized radiation, with incoherently scattering apparatus so as to produce a resulting beam of electromagnetically intense radiation comprising a non-zero magnitude of time-averaged energy flux density; b) the step of transmitting the resulting beam of electromagnetically intense radiation to an electromagnetic-based absorptive apparatus; and, then, c) the step of absorbing the transmitted electromagnetically intense radiation with the electromagnetic-based absorptive apparatus (which comprises electrically charged particles) by way of electromagnetic interaction. Note that the incoherent scattering step described in step (a) hereinbefore can include the step of transmitting electromagnetically intense radiation to absorptive apparatus which is described in step (b) hereinbefore, such that these steps are combined, e.g., as with the application of transmitting, incoherently scattering media. Also, note that if electromagnetic-based incoherent scattering is applied in step (a) hereinbefore, then electromagnetic-based incoherent scattering can include an extent of the electromagnetic-based absorption of electromagnetically intense radiation which is described in step (c) hereinbefore as would be the case with the application of inelastic incoherent reradiation scattering if a beam of electromagnetically intense quanta of electromagnetic radiation is involved, or as would be the case with the application of incoherent scattering which is produced by Coulomb force based collisions (which provides stopping power) if a beam of electromagnetically intense electrically charged particles is involved. In which case, a combined incoherent scattering and transmitting step (as with the application of electromagnetic-based transmitting, incoherently scattering media) can be combined to a respective extent with an electromagnetic-based absorption step, such that steps (a), (b), and (c) hereinbefore can also be combined together.

There are different ways of adjusting the present invention in order to effectively accomplish the result of a respective application including time-averaged particle flux density adjustment, time-averaged energy flux density adjustment, and focal point positioning adjustment. Wherein, one or more ways of adjusting an embodiment of the present invention can be applied in order to effectively accomplish the desired result of an application of the present invention depending on the conditions of the respective application.

FIGS. (8a) and (8b) illustrate two hypothetical embodiments of the present invention which together represent one aspect of the significance of adjusting the time-averaged particle flux density of a beam of electromagnetically neutralized radiation which is applied in certain embodiments of the present invention. Wherein, in the embodiments which are illustrated in FIGS. (8a) and (8b), apparatus (2ak) and (2am), respectively, produce beams of electromagnetically neutralized radiation (4ak) and (4am), respectively. Beams (4ak) and (4am) in the two embodiments are equivalent (comprising equivalent radiation) with the exception that the magnitude of the time-averaged particle flux density in the beam of electromagnetically neutralized radiation (4ak), which is illustrated in FIG. (8a), is less than the magnitude of the time-averaged particle flux density in the beam of electromagnetically neutralized radiation ($4am$), which is illustrated in FIG. ($8b$), and with the condition that the magnitude of the time-averaged energy flux density which is in beam ($4ak$) can arbitrarily be the same as, or different from, the magnitude of the time-averaged energy flux density which is in beam ($4am$).

Subsequently, beams ($4ak$) and ($4am$) are each coherently transmitted by a respectively separate but equivalent coherent transmission apparatus ($6ak$) to a respectively separate but equivalent incoherently scattering and transmitting apparatus ($50ak$). Wherein, apparatus ($50ak$) in the two embodiments are equivalent apparatus which each comprise a uniform distribution of both potential-energy-based and electromagnetic-based incoherently scattering and transmitting apparatus.

Then, each of the beams ($4ak$) and ($4am$) is completely scattered in an incoherent manner in its respectively separate but equivalent apparatus ($50ak$) so as to produce beams of electromagnetically intense radiation ($52ak$) and ($52am$), respectively, which each comprise a non-zero magnitude of time-averaged energy flux density. In which case, each of the beams of electromagnetically intense radiation ($52ak$) and ($52am$) is transmitted up to, and through, the centrally located exit plane in its respective incoherently scattering and transmitting apparatus ($50ak$), and the time-averaged energy flux density which consequentially fluxes through the respective exit plane in each embodiment is represented by its own distribution curve comprising curves ($82$) and ($84$), respectively. Wherein, distribution curves ($82$) and ($84$) are each plotted in a (z-y) plane of which the (y) axis is aligned along the centrally located exit plane of the respectively applied apparatus ($50ak$) in each embodiment. While, in each of the embodiments which are illustrated in FIGS. ($8a$) and ($8b$), a line, comprising line ($z''$) and line ($z'''$), respectively, is drawn tangent to the maximum time-averaged energy flux density of the respective distribution curve, and each intersects the respective (z) axis at a point.

In which case, the maximum time-averaged energy flux density which fluxes through the centrally located exit plane in apparatus ($50ak$) in the embodiment which is illustrated in FIG. ($8a$) is less than the maximum time-averaged energy flux density which fluxes through the centrally located exit plane in apparatus ($50ak$) in the embodiment which is illustrated in FIG. ($8b$) irrespective of whether the time-averaged energy flux density of beam ($4ak$) was initially the same as, or different from, the time-averaged energy flux density of beam ($4am$). Wherein, such maxima of time-averaged energy flux densities are different as such since the time-averaged particle flux density in the beam of electromagnetically neutralized radiation ($4ak$), which is illustrated in FIG. ($8a$), is less than the time-averaged particle flux density in the beam of electromagnetically neutralized radiation ($4am$), which is illustrated in FIGS. ($8b$), and since apparatus ($50ak$) completely incoherently scatters the beam of electromagnetically neutralized radiation applied in each of the embodiments (antecedent to the centrally located exit plane). Thus, the distance on the (z) axis between (0) (zero) and the intersecting point of line ($z''$) in the embodiment which is illustrated in FIG. ($8a$) is less than the distance on the (z) axis between (0) (zero) and the intersecting point of line ($z'''$) in the embodiment which is illustrated in FIG. ($8b$). Note that time-averaged particle flux density adjustment can be accomplished herein, for example, by changing the power setting of the source or sources applied to produce a respectively applied beam of electromagnetically neutralized radiation.

FIGS. ($9a$) and ($9b$) illustrate two hypothetical embodiments of the present invention which together represent one aspect of the lack of the significance of adjusting the time-averaged energy flux density of a beam of electromagnetically neutralized radiation which is applied in certain embodiments of the present invention. Wherein, in the embodiments which are illustrated in FIGS. ($9a$) and ($9b$), apparatus ($2an$) and ($2ap$), respectively, produce beams of electromagnetically neutralized radiation ($4an$) and ($4ap$), respectively. Beams ($4an$) and ($4ap$) both comprise equivalent radiation, both comprise an equal magnitude of time-averaged particle flux density, and both are associated with two superimposed forward traveling wave components (which comprise equivalent amplitudes and wavelengths). However, the two beams are different in that the two superimposed forward traveling wave components which are associated with beam ($4an$) are out of phase to a relatively different extent than the two superimposed forward traveling wave components which are associated with beam ($4ap$), such that beams ($4an$) and ($4ap$) comprise different magnitudes of time-averaged energy flux density.

Subsequently, beams ($4an$) and ($4ap$) are each coherently transmitted by a respectively separate but equivalent coherent transmission apparatus ($6ak$) to a respectively separate but equivalent incoherently scattering and transmitting apparatus ($50ak$). Wherein, apparatus ($50ak$) in the two embodiments are equivalent apparatus which each comprise a uniform distribution of both potential-energy-based and electromagnetic-based incoherently scattering and transmitting apparatus.

Then, each of the beams ($4an$) and ($4ap$) is completely scattered in an incoherent manner in its respectively separate but equivalent apparatus ($50ak$) so as to produce incoherent beams of electromagnetically intense radiation ($52an$) and ($52ap$), respectively, which both comprise an equal non-zero magnitude of time-averaged energy flux density. In which case, each of the beams of electromagnetically intense radiation ($52an$) and ($52ap$) is transmitted up to, and through, the centrally located exit plane in its respective incoherently scattering and transmitting apparatus ($50ak$), and the time-averaged energy flux density which consequentially fluxes through the respective exit plane in each embodiment is represented by its own distribution curve comprising curves ($86$) and ($88$), respectively. Wherein, distribution curves ($86$) and ($88$) are each plotted in a (z-y) plane of which the (y) axis is aligned along the centrally located exit plane of the respectively applied apparatus ($50ak$) in each embodiment. While, in each of the embodiments which are illustrated in FIGS. ($9a$) and ($9b$), a respectively separate but equivalent line ($z''$) is drawn tangent to the maximum time-averaged energy flux density of the respectively separate but equivalent distribution curve, and each intersects the respective (z) axis at a point.

In which case, the maximum time-averaged energy flux density which fluxes through the centrally located exit plane in apparatus ($50ak$) in the embodiment which is illustrated in FIG. ($9a$) is equal to the maximum time-averaged energy flux density which fluxes through the centrally located exit plane in apparatus ($50ak$) in the embodiment which is illustrated in FIG. ($9b$) irrespective of the difference in the magnitude of the time-averaged energy flux density of beam ($4an$) compared to the magnitude of the time-averaged energy flux density of beam ($4ap$). Wherein, such maxima of time-averaged energy flux densities are the same as such since the time-averaged particle flux density which is in the beam of electromagnetically neutralized radiation ($4an$) in the embodiment which is illustrated in FIG. ($9a$) is equal to the time-averaged particle flux density which is in the beam of electromagnetically neutralized radiation (4*ap*) in the embodiment which is illustrated in FIG. (9*b*), and since apparatus (50*ak*) in each of the embodiments completely incoherently scatters the beam of electromagnetically neutralized radiation which is respectively applied (antecedent to the centrally located exit plane). Thus, the distance on the (z) axis between (0) (zero) and the intersecting point of line (z") in the embodiment which is illustrated in FIG. (9*a*) is equal to the distance on the (z) axis between (0) (zero) and the intersecting point of line (z") in the embodiment which is illustrated in FIG. (9*b*). (Note that time-averaged energy flux density adjustment can be accomplished by changing the relative phases of the waves, i.e., here, by changing the relative phase of the wave components, which are associated with a respectively applied beam of electromagnetically neutralized radiation.)

FIGS. (10*a*) and (10*b*) illustrate two hypothetical embodiments of the present invention which together represent one aspect of the significance of adjusting the time-averaged energy flux density of a beam of electromagnetically neutralized radiation which is applied in certain embodiments of the present invention. Wherein, in the embodiments which are illustrated in FIGS. (10*a*) and (10*b*), apparatus (2*ar*) and (2*at*), respectively, produce beams of electromagnetically neutralized radiation (4*ar*) and (4*at*), respectively. Beams (4*ar*) and (4*at*) both comprise equivalent radiation, both comprise an equal magnitude of time-averaged particle flux density, and both are associated with two superimposed forward traveling wave components (which comprise equivalent amplitudes and wavelengths). However, the two beams are different in that beam (4*ar*) is associated with forward traveling wave components which are out of phase to a greater extent than the forward traveling wave components which are associated with beam (4*at*), such that the beam of electromagnetically neutralized radiation (4*ar*) comprises less time-averaged energy flux density than the beam of electromagnetically neutralized radiation (4*at*).

Subsequently, beams (4*ar*) and (4*at*) are each coherently transmitted by a respectively separate but equivalent coherent transmission apparatus (6*ak*) to a respectively separate but equivalent incoherently scattering and transmitting apparatus (50*ar*). Wherein, apparatus (50*ar*) in the two embodiments are equivalent apparatus which each comprise a uniform distribution of both potential-energy-based and electromagnetic-based incoherently scattering and transmitting apparatus.

Then, in these particular embodiments, each of the beams (4*ar*) and (4*at*) is only partially scattered in an incoherent manner in its respectively separate but equivalent apparatus (50*ar*) so as to produce beams of electromagnetically intense radiation (52*ar*) and (52*at*), respectively, which each comprise a non-zero magnitude of time-averaged energy flux density. In which case, each of the beams of electromagnetically intense radiation (52*ar*) and (52*at*) is transmitted up to, and through, the centrally located exit plane in its respective incoherently scattering and transmitting apparatus (50*ar*), and the time-averaged energy flux density which consequentially fluxes through the respective exit plane in each embodiment is represented by its own distribution curve comprising curves (90) and (92), respectively. Wherein, distribution curves (90) and (92) are each plotted in a (z-y) plane of which the (y) axis is aligned along the centrally located exit plane of the respectively applied apparatus (50*ar*) in each embodiment. While, in each of the embodiments which are illustrated in FIGS. (10*a*) and (10*b*), a line, comprising line (z') and line (z"), respectively, is drawn tangent to the maximum time-averaged energy flux density of the respective distribution curve, and each intersects the respective (z) axis at a point.

Here, even though the time-averaged particle flux densities of electromagnetically neutralized beams (4*ar*) and (4*at*) in the embodiments which are illustrated in FIGS. (10*a*) and (10*b*) are equal, the incoherently scattering apparatus in apparatus (50*ar*) in each of the embodiments only partially incoherently scatters the respectively applied beam of electromagnetically neutralized radiation such that electromagnetic-based incoherently scattering has a greater effect in apparatus (50*ar*) in the embodiment which is illustrated in FIG. (10*b*), since the beam of electromagnetically neutralized radiation (4*at*), which is applied in the embodiment which is illustrated in FIG. (10*b*), comprises a greater time-averaged energy flux density than the beam of electromagnetically neutralized radiation (4*ar*) which is applied in the embodiment which is illustrated in FIG. (10*a*). Wherein, the time-averaged energy flux density in beam (4*at*) consequentially facilitates electromagnetic-based incoherent scattering in apparatus (50*ar*) in the embodiment which is illustrated in FIG. (10*b*) to a greater extent than time-averaged energy flux density in beam (4*ar*) facilitates electromagnetic-based incoherently scattering in apparatus (50*ar*) in the embodiment which is illustrated in FIG. (10*a*).

Thus, the maximum time-averaged energy flux density which fluxes through the centrally located exit plane in apparatus (50*ar*) in the embodiment which is illustrated in FIG. (10*a*) is less than the maximum time-averaged energy flux density which fluxes through the centrally located exit plane in apparatus (50*ar*) in the embodiment which is illustrated in FIG. (10*b*). Therefore, the distance on the (z) axis between (0) (zero) and the intersecting point of line (z') in the embodiment which is illustrated in FIG. (10*a*) is less than the distance on the (z) axis between (0) (zero) and the intersecting point of line (z") in the embodiment which is illustrated in FIG. (10*b*).

FIGS. (11*a*) and (11*b*) illustrate two hypothetical embodiments of the present invention which together represent one aspect of the significance of adjusting the depth of the focal point of an applied beam of electromagnetically neutralized radiation in the target in certain embodiments of the present invention. In which case, in each of the two embodiments which are illustrated in FIGS. (11*a*) and (11*b*), a respectively separate but equivalent apparatus (2*au*) produces a respectively separate but equivalent focused beam of electromagnetically neutralized radiation (4*au*). Wherein, the two embodiments which are illustrated in FIGS. (11*a*) and (11*b*) both comprise equivalent radiation, both comprise an equal magnitude of time-averaged particle flux density, and both comprise an equal magnitude of time-averaged energy flux density. However, the two beams are different in that each beam is focused towards a focal point which is positioned at a different depth in a respectively separate but equivalent incoherently scattering and transmitting apparatus (50*ak*).

Subsequently, the beams of electromagnetically neutralized radiation (4*au*), which are respectively in the two embodiments illustrated in FIGS. (11*a*) and (11*b*), are each coherently transmitted by a respectively separate but equivalent (except for their lengths) coherent transmission apparatus (6*ak*) to a respectively separate but equivalent incoherently scattering and transmitting apparatus (50*ak*). Wherein, apparatus (50*ak*) in the two embodiments are equivalent apparatus which each comprise a uniform distribution of both potential-energy-based and electromagnetic-based incoherently scattering and transmitting apparatus.

Then, in the two embodiments which are illustrated in FIGS. (11a) and (11b), each of the respectively separate but equivalent coherently transmitted beams of electromagnetically neutralized radiation (4au) is incoherently scattered to a respective extent by a respectively separate but equivalent apparatus (50ak) so as to produce beams of electromagnetically intense radiation (52au) and (52av), respectively, which each comprise a respective non-zero magnitude of time-averaged energy flux density. In which case, each of the beams of electromagnetically intense radiation (52au) and (52av) is transmitted up to, and through, the focal plane at a respective depth within its respective incoherently scattering and transmitting apparatus (50ak), and the time-averaged energy flux density which consequentially fluxes through the focal plane in each embodiment is represented by its own distribution curve comprising curves (94) and (96), respectively. Wherein, distribution curves (94) and (96) are each plotted in a (z-y) plane of which the (y) axis is aligned along the focal plane of the applied beam in the respectively applied apparatus (50ak) in each embodiment. While, in each of the embodiments which are illustrated in FIGS. (11a) and (11b), a line, comprising line (z") and line (z'"), respectively, is drawn tangent to the maximum time-averaged energy flux density of the respective distribution curve, and each intersects the respective (z) axis at a point.

In the embodiment which is illustrated in FIG. (11a), the focal point of beam (4au) is positioned in the incoherently scattering and transmitting apparatus (50ak) at a lesser depth than the depth at which the focal point of beam (4au) is positioned in the incoherently scattering and transmitting apparatus (50ak) in the embodiment which is illustrated in FIG. (11b). Wherein, the number of incoherent scatterers which are in the path of the beam of electromagnetically neutralized radiation (4au) anterior to the focus in the embodiment which is illustrated in FIG. (11a) is less than the number of incoherent scatterers which are in the path of the beam of electromagnetically neutralized radiation (4au) anterior to the focus in the embodiment which is illustrated in FIG. (11b).

In which case, incoherently scattering apparatus in apparatus (50ak) in the embodiment which is illustrated in FIG. (11a) incoherently scatters the respectively applied beam of electromagnetically neutralized radiation (4au) to a lesser extent anterior to its focal point than incoherently scattering apparatus in apparatus (50ak) incoherently scatters the respectively applied beam of electromagnetically neutralized radiation (4au) anterior to its focal point in the embodiment which is illustrated in FIG. (11b). Thus, the maximum time-averaged energy flux density which fluxes through the focal plane in apparatus (50ak) in the embodiment which is illustrated in FIG. (11a) is less than the maximum time-averaged energy flux density which fluxes through the focal plane in apparatus (50ak) in the embodiment which is illustrated in FIG. (11b). Therefore, the distance on the (z) axis between (0) (zero) and the intersecting point of line (z") in the embodiment which is illustrated in FIG. (11a) is less than the distance on the (z) axis between (0) (zero) and the intersecting point of line (z'") in the embodiment which is illustrated in FIG. (11b).

FIG. (12a) is an illustration of a side view of a somewhat specific preferred embodiment of the present invention which is applied for transmitting power in an effective manner, and includes a longitudinally sectioned view of the respectively applied air filled tubing. The steps which are applied in the preferred embodiments which pertain to FIGS. (4), (5), (6), and (7) are, in general, applicable in the preferred embodiment which is illustrated in FIG. (12a) with some respective modifications.

Wherein, in the preferred embodiment which is illustrated in FIG. (12a), apparatus (2cf), which comprises a source of electromagnetically intense, coherent, forward propagating radiation and an interferometer (e.g., apparatus which is equivalent to the version of the Michelson interferometer which is illustrated in FIG. 1' or apparatus which is a version of a Mach-Zehnder interferometer), produces a beam of electromagnetically neutralized radiation (4cf) which is coherently transmitted by coherent transmission media comprising air (6cf) and tubing (or hollow cylindrical guide) (6ch) to power utilization apparatus (8cf). Wherein, the adverse electromagnetic interaction of neutralized beam (4cf) with electrically charged particles comprised in air (6cf) and tubing (6ch) is eliminated in direct proportion to the time-averaged energy flux density which is eliminated from beam (4cf) during transmission. In which case, the adverse electromagnetic effects of transmitting energy for power are eliminated in direct proportion to the extent to which such adverse electromagnetic interaction is eliminated (e.g., adverse electromagnetic-based scattering, absorption, and corresponding adverse power attenuation of beam 4cf are eliminated to an extent such that energy is conserved during transmission, and, consequentially, the inefficiency of transmitting energy for power is eliminated to a corresponding extent).

In this case, a) coherently transmitting tubing (6ch) comprises tubing walls which produce a potential energy barrier which changes significantly as follows: i) changes significantly relative to the potential energy comprised by its respective surroundings (i.e., here, air 6cf inside, and air outside, tubing 6ch), and ii) changes significantly relative to the total energy comprised by the coherently transmitted electromagnetically neutralized radiation in beam (4cf); and b) coherently transmitting tubing (6ch) comprises particles on the inner surface which each comprise a size and spacing which are each significantly smaller than the wavelengths of the waves which are associated with the coherently transmitted radiation in beam (4cf). While, with respect to the coherently transmitting air (6cf), the potential energy of the air (6cf) changes insignificantly relative to the total energy comprised by the coherently transmitted electromagnetically neutralized radiation in beam (4cf). Wherein, coherent transmission processes involve a quantum mechanical functional relation between the total energy comprised by the coherently transmitted electromagnetically neutralized radiation in beam (4cf) and the potential energy comprised by tubing (6ch) and air (6cf).

However, more specifically, if a beam of partly electromagnetically neutralized radiation, which comprises, for example, a very small time-averaged energy flux density, were applied, then coherent transmission processes would also involve electromagnetic interaction between coherently transmitted electromagnetically intense radiation in beam (4cf) and electrically charged particles comprised in air (6cf) and tubing (6ch). In which case, electromagnetic-based coherent transmission media would comprise particles, which comprise electrically charged particles, on the inner surface of tubing (6ch) which each comprise a size and spacing which are each significantly smaller than the wavelengths of the waves which are associated with the coherently transmitted beam of partly electromagnetically neutralized radiation. While, in addition, if a beam of partly electromagnetically neutralized radiation is applied, then the tubing walls should also be as electromagnetically non-absorptive as possible.

Figure 4:
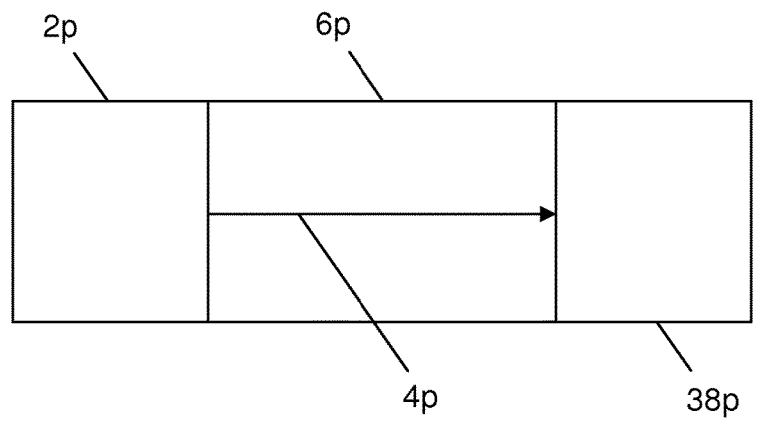
Figure 5:
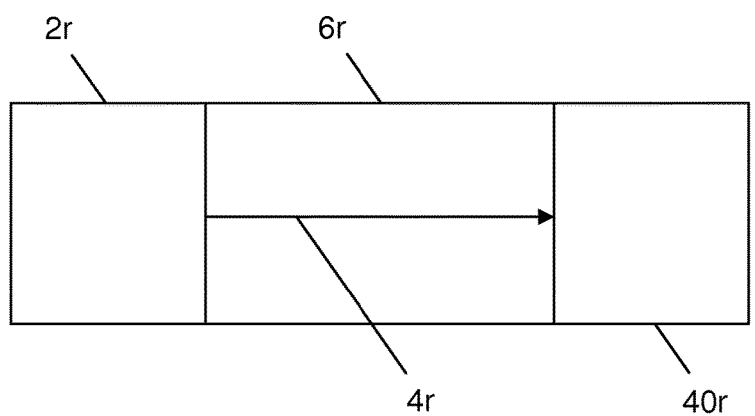
Figure 6:
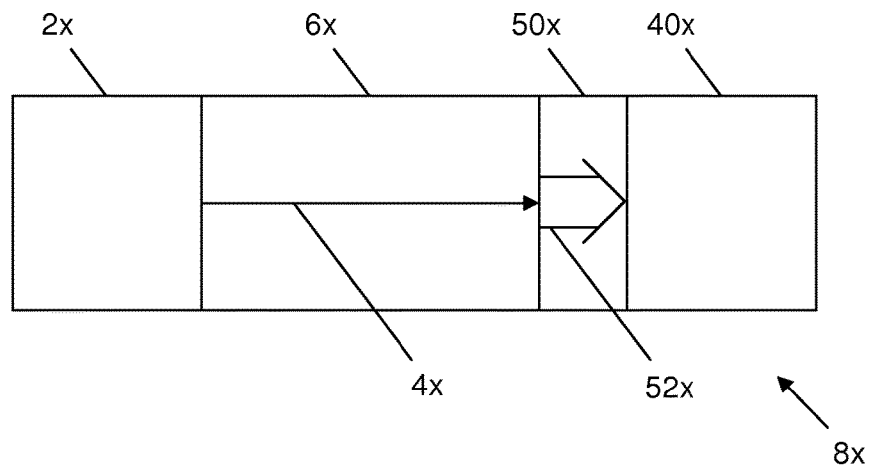
Figure 7:
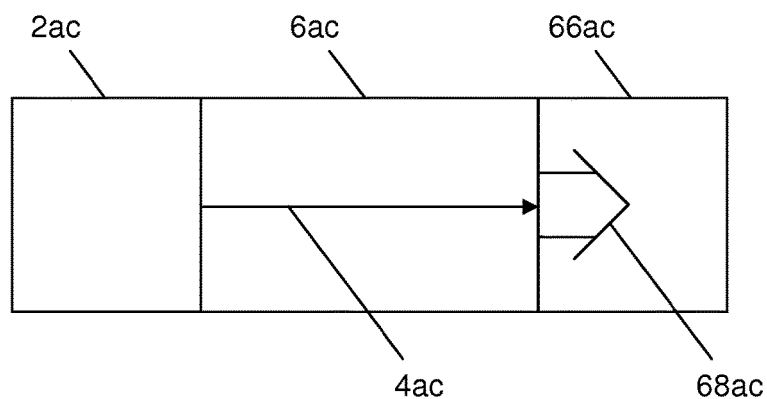
Figure 8A:
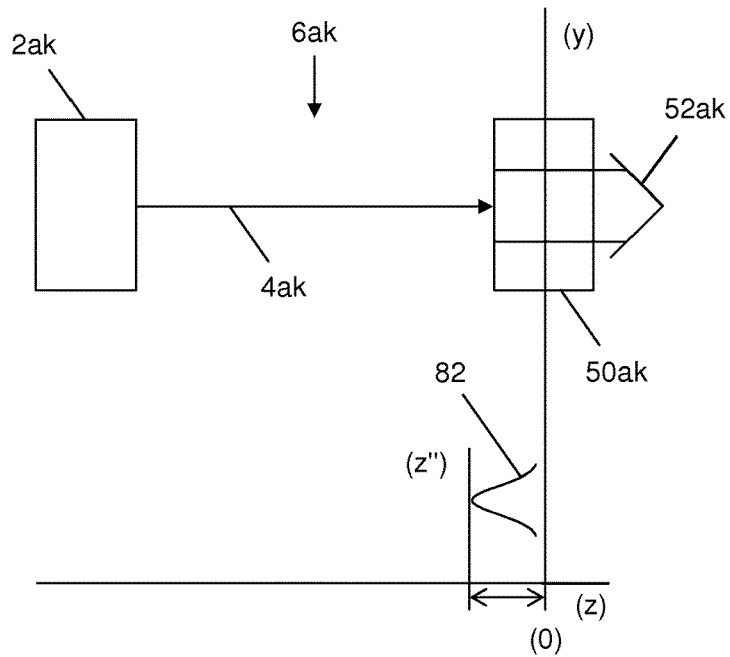
Figure 8B:
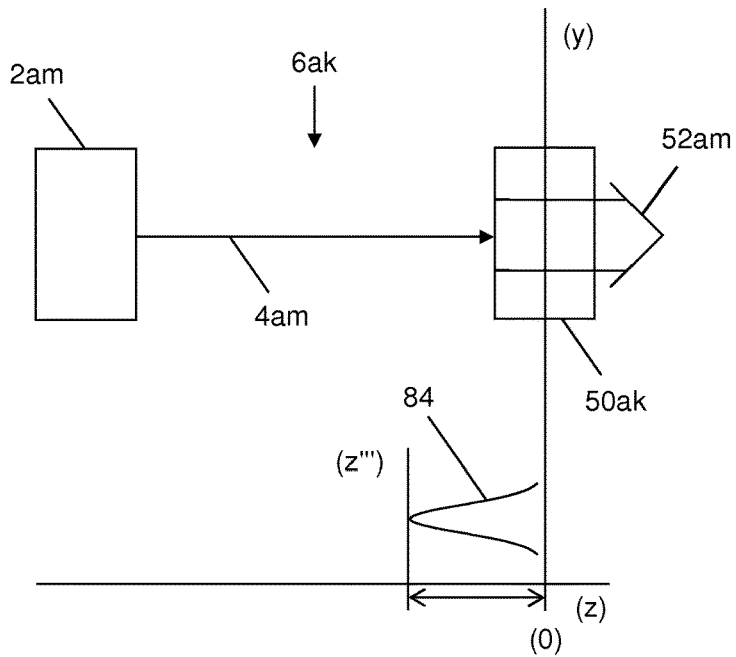
Figure 9A:
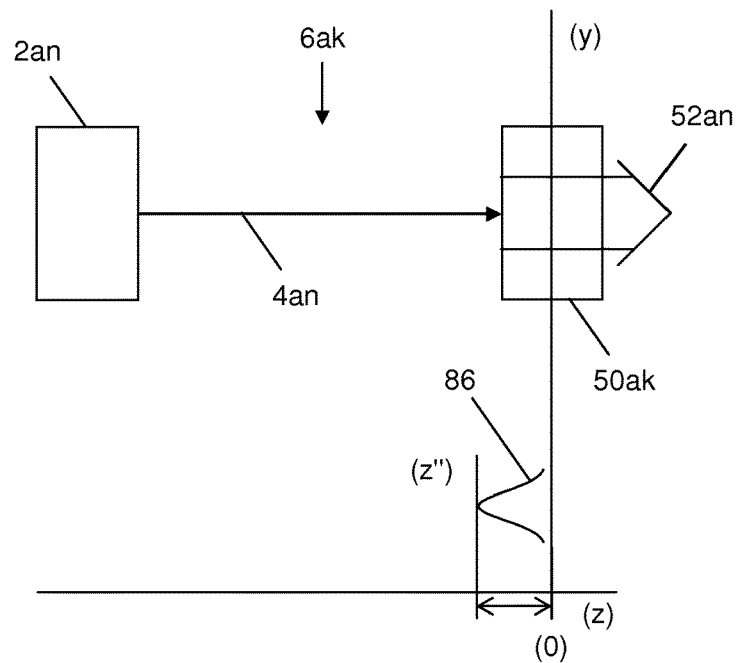
Figure 9B:
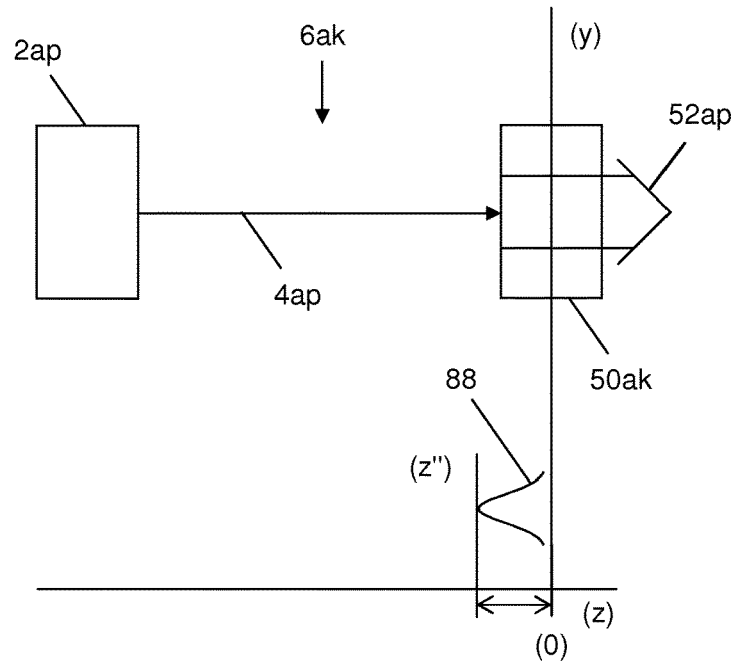

Nevertheless, then, in due course, energy is transferred from the transmitted beam, which comprises electromagnetically neutralized quanta of electromagnetic radiation or electromagnetically neutralized electrically charged particles, to power utilization apparatus (8cf) in order to produce the result of the respective embodiment by a power utilization process which comprises one of the following examples depending upon the embodiment applied: a) a power utilization process in which a momentum-based utilization apparatus utilizes the momentum applied by a transmitted beam of electromagnetically neutralized radiation, e.g., a pressure transducer utilizes the pressure applied by a transmitted electromagnetically neutralized particle beam (comprising electromagnetically, neutralized quanta of electromagnetic radiation or electromagnetically neutralized electrically charged particles) in order to produce electrical voltage for supplying power to a load (as described generally in the preferred embodiment which pertains to FIG. 4); b) a power utilization process in which electromagnetic-based utilization apparatus, which comprises electrically charged particles, utilizes a transmitted beam of partly electromagnetically neutralized radiation by way of electromagnetic interaction when a beam of partly electromagnetically neutralized radiation is applied (as described generally in the preferred embodiment which pertains to FIG. 5), e.g., an electromagnetic-based detector utilizes a transmitted beam of partly electromagnetically neutralized radiation in order to produce electrical output for supplying power to a load; or c) a power utilization process which includes the following: i) the step of incoherently scattering a transmitted beam of electromagnetically neutralized radiation with incoherently scattering media so as to produce a beam of electromagnetically intense radiation comprising a significant non-zero magnitude of time-averaged energy flux density, i.e., so as to produce a beam of electromagnetically intense radiation comprising an incoherent beam of radiation which is produced by incoherent scattering, or also comprising any transmitted remaining portion of a beam of partly electromagnetically neutralized radiation which is not incoherently scattered if a beam of partly electromagnetically neutralized radiation is applied; ii) the step of transmitting the beam of electromagnetically intense radiation produced as such (via transmission media) to an electromagnetic-based utilization apparatus; and then iii) the step of utilizing the transmitted beam of electromagnetically intense radiation with electromagnetic-based utilization apparatus comprising electrically charged particles (by way of electromagnetic interaction) for power, e.g., an electromagnetic-based detector utilizes a transmitted beam of electromagnetically intense radiation in order to produce electrical output for supplying power to a load (as described in general terms, for example, in the preferred embodiments which pertain to FIGS. 6 and 7).

Note that the incoherent scattering step which is described in step (i) hereinbefore can include the step of transmitting the electromagnetically intense radiation to the utilization apparatus which is described in step (ii) hereinbefore, such that these steps are combined (e.g., as with the application of forward transmitting, incoherently scattering media). Also, note that if electromagnetic-based incoherent scattering is applied in step (i) hereinbefore, then electromagnetic-based incoherent scattering can include an extent of the electromagnetic-based utilization of electromagnetically intense radiation which is described in step (iii) hereinbefore as would be the case with the application of inelastic incoherent reradiation scattering if a beam of electromagnetically intense quanta of electromagnetic radiation is involved, or as would be the case with the application of incoherent scattering which is produced by inelastic Coulomb force based collisions if a beam of electromagnetically intense electrically charged particles is involved. In which case, a combined incoherent scattering and transmitting step (as with the application of electromagnetic-based forward transmitting, incoherently scattering media) can be combined to a respective extent with an electromagnetic-based utilization step, such that steps (i), (ii), and (iii) hereinbefore can also be combined together.

Furthermore, note that this preferred embodiment of the present invention can be applied for achieving a form of electromagnetically "resistance-less" power transmission when a beam of totally electromagnetically neutralized radiation is applied, or a form of electromagnetically "low-resistance" power transmission when a beam of partly electromagnetically neutralized radiation is applied. Moreover, note that if a beam of electromagnetically neutralized electrons is transmitted to a targeted utilization apparatus, and the transmitted electromagnetically neutralized electrons subsequently become static in the utilization apparatus by, for example, a scattering process which includes Coulomb force based collisions, then the electromagnetically neutralized electrons will become electromagnetically intense electrons upon becoming static, and can then be utilized to produce an electrical voltage, i.e., a potential gradient.

FIG. (12b) is an illustration of a side view of a somewhat different preferred embodiment of the present invention which is applied for transmitting power in an effective manner, and also includes a longitudinally sectioned view of the respectively applied air filled tubing. The steps which are applied in the preferred embodiment which is illustrated in FIG. (12a) are applicable in the preferred embodiment which is illustrated in FIG. (12b) except that, as a modification, two tube sections merge into a single section of tubing (i.e., the merged tubing acts as a coupler).

Wherein, in the preferred embodiment which is illustrated in FIG. (12b), apparatus (2ck) and (2cm) produce beams of electromagnetically neutralized radiation (4ck) and (4cm), respectively, which are coherently transmitted by tube sections (6ck) and (6cm), respectively, to a merged section of tubing (6cn). Then, neutralized beams (4ck) and (4cm) are combined by the merged section of tubing (6cn) into a single beam of electromagnetically neutralized radiation (4cn) which is transmitted in a coherent manner by the merged section of tubing (6cn) to, and utilized in due course by, power utilization apparatus (8ck).

FIG. (12c) is an illustration of a side view of another somewhat different preferred embodiment of the present invention which is applied for transmitting power in an effective manner, and also includes a longitudinally sectioned view of the respectively applied air filled tubing. The steps which are applied in the preferred embodiment which is illustrated in FIG. (12a) are applicable in the preferred embodiment which is illustrated in FIG. (12c) except that, as a modification, the applied tubing branches into two sections of tubing (i.e., the branched tubing acts as a splitter).

Wherein, in the preferred embodiment which is illustrated in FIG. (12c), apparatus (2cp) produces a beam of electromagnetically neutralized radiation (4cp) which is coherently transmitted by tube section (6cp) to a branched section of tubing, and then is divided by the branched section of tubing into beam fractions of electromagnetically neutralized radiation (4cr) and (4ct). Then, tube sections (6cr) and (6ct) transmit neutralized beam fractions (4cr) and (4ct), respectively, in a coherent manner to power utilization apparatus ($8cr$) and ($8ct$), respectively, which then each utilize the respectively transmitted neutralized beam fraction for power in due course.

FIG. ($12d$) is an illustration of a side view of yet another somewhat different preferred embodiment of the present invention which is applied for transmitting power in an effective manner, and also includes a longitudinally sectioned view of the respectively applied air filled tubing. The steps which are applied in the preferred embodiments which are illustrated in FIGS. ($12a$), ($12b$), and ($12c$) are applicable in the preferred embodiment which is illustrated in FIG. ($12d$) except that, as a modification, two sections of tubing merge into a single section of tubing (i.e., the merged tubing acts as a coupler), and then the single section of tubing branches into two sections of tubing (i.e., the branched tubing acts as a splitter).

Wherein, in the preferred embodiment which is illustrated in FIG. ($12d$), apparatus ($2cu$) and ($2cv$) produce beams of electromagnetically neutralized radiation ($4cu$) and ($4cv$), respectively, which are coherently transmitted by tube sections ($6cu$) and ($6cv$), respectively, to a merged section of tubing ($6cw$). Then, neutralized beam fractions ($4cu$) and ($4cv$) are combined by the merged section of tubing ($6cw$) into a single beam of electromagnetically neutralized radiation ($4cw$) which is coherently transmitted by the merged section of tubing ($6cw$) to a branched section of tubing which then divides beam ($4cw$) into beam fractions of electromagnetically neutralized radiation ($4cx$) and ($4cy$). Subsequently, neutralized beam fractions ($4cx$) and ($4cy$) are coherently transmitted by tube sections ($6cx$) and ($6cy$), respectively, to power utilization apparatus ($8cx$) and ($8cy$), respectively, which then each utilize the respectively transmitted neutralized beam fraction for power in due course.

FIG. ($13$) is an illustration of a side view of a somewhat specific preferred embodiment of the present invention which is applied for transmitting data in an effective manner for wireline communications, and includes a longitudinally sectioned view of the air filled tubing which is respectively applied for data transmission. The steps which are applied in the preferred embodiments for power transmission which pertain to FIGS. ($12a$), ($12b$), ($12c$), and ($12d$) are, in general, applicable in the preferred embodiment for wireline communications herein with some respective modifications.

In which case, in the preferred embodiment which is illustrated in FIG. ($13$), transmitter apparatus ($2da$) comprises transmitter device ($2db$) which comprises a miniature laser source and an interferometer. Wherein, device ($2db$) produces a beam of electromagnetically neutralized optical wavelength quanta of electromagnetic radiation ($4da_1$).

Then, beam ($4da_1$) is coherently transmitted by coherent transmission media comprising air to modulator ($98da$), and then coherently transmitted and modulated by modulator ($98da$), which comprises coherent transmission media, and changes its respective potential energy (or, similarly, changes its respective refractive index) in order to modulate (e.g., a coherently transmissive acousto-optic modulator) so as to produce a data-encoded modulated beam of electromagnetically neutralized quanta of electromagnetic radiation ($4da_2$) (e.g., an amplitude modulated, i.e., momentum amplitude modulated, pulsed beam of electromagnetically neutralized quanta of electromagnetic radiation which is digitally encoded with data in a manner which is substantially equivalent to the manner in which each of the beams of electromagnetically neutralized radiation which are illustrated in FIGS. 2-$c$ and 3-$c$ is digitally encoded with binary data). Nevertheless, then, beam ($4da_2$) is coherently transmitted by air comprised in apparatus ($2da$) so as to exit apparatus ($2da$).

Then, the modulated beam of electromagnetically neutralized quanta of electromagnetic radiation ($4da_2$) is coherently transmitted by coherent transmission media comprising air ($6da$) and tubing (or hollow cylindrical guide) ($6db$), which comprises single mode dimensions, to receiver apparatus ($8da$). Wherein, the adverse electromagnetic interaction of neutralized beam ($4da_2$) with electrically charged particles comprised in air ($6da$) and tubing ($6db$) is eliminated in direct proportion to the time-averaged energy flux density which is eliminated from beam ($4da_2$) during transmission. In which case, the adverse electromagnetic effects of transmitting energy for wireline communications are eliminated in direct proportion to the extent to which such adverse electromagnetic interaction is eliminated.

With respect to a prior art fiber optic system, the following examples of the advantages of the present invention for wireline communications are considered to be the case: a) The present invention eliminates adverse electromagnetic-based scattering, e.g., Rayleigh scattering, adverse electromagnetic-based absorption, and corresponding adverse electromagnetic-based signal attenuation of the electromagnetically neutralized beam in direct proportion to the time-averaged energy flux density which is eliminated from the neutralized beam during transmission so as to increase the distance a signal can travel at various wavelengths without being amplified (or also regenerated), such that the need for relatively high transmitter power output and/or the need for signal amplification (or also regeneration) is eliminated to a directly proportional extent, and such that the bandwidth which is available (for practical purposes) for wireline communications (in terms of frequencies) is increased; b) The present invention decreases the refractive index of the transmitting medium relative to an optical fiber, such that the speed at which a signal travels is increased to a directly proportional extent, and thus the bandwidth which is available for wireline communications is correspondingly increased in this way (i.e., in terms of the speed of data transmission); and c) The present invention eliminates some of the complexities of making and deploying a conveying medium for high bandwidth data transmission for wireline communications by applying air filled tubing instead of optical fiber.

Then, beam ($4da_2$) is utilized by an appropriate process for communications reception by receiving apparatus ($8da$). Wherein, beam ($4da_2$) is utilized, for example, by one of the power utilizing processes which are described in the preferred embodiment which pertains to FIG. ($12a$) except that the data encoded in the power of the coherently transmitted modulated beam of electromagnetically neutralized quanta of electromagnetic radiation ($4da_2$) is utilized by receiving apparatus ($8da$) for communications. Note that another preferred embodiment could apply a transceiver (which comprises a transmitter and a receiver as, for example, the transmitter and receiver which are described herein) at each end of the link for two way communications. While furthermore, note that a version of the preferred embodiment described herein could be applied for linking computers in a computer network, e.g., for linking computers in a computer cluster.

FIG. ($14$) illustrates a side view of another somewhat specific preferred embodiment of the present invention which is applied for transmitting data for wireline communications in an effective manner. The steps which are applied in the preferred embodiment which pertains to FIG. ($13$) are, in general, applicable in the preferred embodiment which is illustrated in FIG. (14) with some respective modifications for the method of communications employed herein which applies wave division multiplexing and demultiplexing.

Wherein, in the preferred embodiment which is illustrated in FIG. (14), transmitter apparatus ($2dc$) comprises a plurality of transmitter devices ($2dd$), ($2de$), and ($2df$) which each comprise a miniature laser source (which each produce a laser beam comprising an exclusive linewidth), and an interferometer. In which case, devices ($2dd$), ($2de$), and ($2df$) each produce a beam of optical wavelength electromagnetically neutralized quanta of electromagnetic radiation comprising beams ($4dd_1$), ($4de_1$), and ($4df_1$), respectively.

Then, beams ($4dd_1$), ($4de_1$), and ($4df_1$), which comprise respectively different linewidths of electromagnetically neutralized quanta of electromagnetic radiation, are coherently transmitted by coherent transmission media comprising air to modulators ($98dd$), ($98de$), and ($98df$), respectively. Beams ($4dd_1$), ($4de_1$), and ($4df_1$) are then modulated and coherently transmitted by modulators ($98dd$), ($98de$), and ($98df$), respectively (each of which modulates by changing its respective potential energy or, similarly, each of which modulates by changing its respective refractive index, e.g., each comprises a coherently transmissive acousto-optic modulator), so as to produce data-encoded modulated beams of electromagnetically neutralized quanta of electromagnetic radiation ($4dd_2$), ($4de_2$), and ($4df_2$), respectively (e.g., amplitude modulated, i.e., momentum amplitude modulated, pulsed beams of electromagnetically neutralized quanta of electromagnetic radiation which each is digitally encoded with data in a manner which is substantially equivalent to the manner in which each of the beams of electromagnetically neutralized radiation which are illustrated in FIGS. 2-c and 3-c is digitally encoded with binary data). Subsequently, beams ($4dd_2$), ($4de_2$), and ($4df_2$) are coherently transmitted by air to, and multiplexed by, multiplexer ($100dc$) so as to produce a multiplexed beam of electromagnetically neutralized quanta of electromagnetic radiation ($4dc$).

After that, the neutralized multiplexed beam ($4dc$) is coherently transmitted by coherent transmission media comprising air ($6dc$) and tubing ($6dd$), which comprises single mode dimensions, to demultiplexer ($102dc$). Wherein, the adverse electromagnetic interaction of multiplexed beam ($4dc$) with electrically charged particles comprised in air ($6dc$) and tubing ($6dd$) is eliminated in direct proportion to the time-averaged energy flux density which is eliminated from beam ($4dc$) during transmission. In which case, the adverse electromagnetic effects of transmitting energy for wireline communications are eliminated in direct proportion to the extent to which such adverse electromagnetic interaction is eliminated (which includes the elimination of the example adverse electromagnetic effects of transmitting energy for wireline communications which are eliminated in the preferred embodiment which pertains to FIG. 13).

Next, demultiplexer ($102dc$) demultiplexes beam ($4dc$) into separate modulated beams of electromagnetically neutralized quanta of electromagnetic radiation of respective linewidths comprising beams ($4dd_3$), ($4de_3$), and ($4df_3$), which are then coherently transmitted to receiver apparatus ($8dd$), ($8de$), and ($8df$), respectively, which are collectively comprised in receiver apparatus ($8dc$). Wherein, the utilization apparatus comprised in each of the receiver apparatus ($8dd$), ($8de$), and ($8df$) then utilizes the respectively transmitted modulated neutralized beam by an appropriate process for communications reception (e.g., by one of the receiving processes described in the preferred embodiment which pertains to FIG. 13, that is, for example, by one of the power utilizing processes which are described in the preferred embodiment which pertains to FIG. 12a except that the data encoded in the power of each modulated beam of electromagnetically neutralized quanta of electromagnetic radiation herein is utilized by a respective receiving apparatus for communications). Note that another preferred embodiment could apply a transceiver (which comprises a transmitter and a receiver as, for example, the transmitter and receiver which are described herein) and a respective multiplexer and demultiplexer at each end of the link for two way communications. While furthermore, note that a version of the preferred embodiment described herein could be applied for linking computers in a computer network, e.g., for linking computers in a computer cluster.

FIG. (14') is a somewhat detailed illustration of one version of the preferred embodiment of the present invention which is illustrated in FIG. (14). In which case, FIG. (14') especially illustrates multiplexer ($100dc'$-A) which is one version of multiplexer ($100dc$) which is illustrated in FIG. (14), and also especially illustrates demultiplexer ($102dc'$-A) which is one version of demultiplexer ($102dc$) which is illustrated in FIG. (14). Wherein, the steps which are applied in the preferred embodiment which pertains to FIG. (14), which comprises a method which applies multiplexing and demultiplexing for transmitting data in an effective manner for wireline communications, are, in general, applicable in the preferred embodiment which is illustrated in FIG. (14') except that, more specifically, the preferred embodiment which is illustrated in FIG. (14') applies multiplexer ($100dc'$-A) which comprises prism ($100dc'$-B), and applies demultiplexer ($102dc'$-A) which comprises prism ($102dc'$-B).

Other preferred embodiments for transmitting data in an effective manner for wireline communications apply methods which are generally equivalent to, but somewhat more specifically different from, the methods which are applied in the preferred embodiments which pertain to FIGS. (13) and (14) (which are exemplified by the application of electromagnetically neutralized optical wavelengths of quanta of electromagnetic radiation). Wherein, the preferred embodiments referred to herein are somewhat different in that they are each respectively modified for inclusively producing, transmitting, and receiving longer wavelengths of electromagnetically neutralized quanta of electromagnetic radiation relative to the optical wavelengths.

Still other preferred embodiments for transmitting data in an effective manner for wireline communications are different in that each applies a method which applies optical fiber as a coherent transmission medium instead of air filled tubing as applied in the preferred embodiments which pertain to FIGS. (13), (14), and (14'). Wherein, in one such preferred embodiment, apparatus, which comprises a miniature laser and an interferometer, produces a data-encoded modulated beam of electromagnetically neutralized quanta of electromagnetic radiation (e.g., an amplitude modulated, i.e., momentum amplitude modulated, pulsed beam of electromagnetically neutralized quanta of electromagnetic radiation which is digitally encoded with data in a manner which is substantially equivalent to the manner in which each of the beams of electromagnetically neutralized radiation which are illustrated in FIGS. 2-c and 3-c is digitally encoded with binary data). Then, the neutralized beam is coherently transmitted by an optical fiber to a receiver apparatus.

In which case, the adverse electromagnetic interaction of the neutralized beam with electrically charged particles comprised in the optical fiber is eliminated in direct proportion to the time-averaged energy flux density which is eliminated from the coherently transmitted neutralized beam during transmission. Wherein, the adverse electromagnetic effects of transmitting energy for wireline communications (e.g., adverse electromagnetic-based scattering, e.g., Rayleigh scattering, adverse electromagnetic-based absorption, and corresponding adverse electromagnetic-based signal attenuation of the neutralized beam) are eliminated in direct proportion to the extent to which such adverse electromagnetic interaction is eliminated.

In this case, the coherently transmitting optical fiber comprises an optical fiber core which comprises potential energy which changes significantly relative to the potential energy comprised by the respectively comprised cladding of the optical fiber, and relative to the total energy comprised by the coherently transmitted electromagnetically neutralized quanta of electromagnetic radiation so as to produce a significant potential energy barrier (which effectively produces total internal reflection). While, the coherently transmitting optical fiber core also comprises particles, comprising electrically charged particles, which each comprise the following: a) a size and spacing which are each significantly smaller than the wavelengths of the waves of the quanta of electromagnetic radiation comprised in the coherently transmitted neutralized beam; and b) potential energy which changes insignificantly relative to the potential energy comprised by its respective surroundings, and relative to the total energy comprised by the electromagnetically neutralized quanta of electromagnetic radiation which are coherently transmitted inside the optical fiber core. Wherein, coherent transmission processes involve a quantum mechanical functional relation between the total energy comprised by the coherently transmitted electromagnetically neutralized quanta of electromagnetic radiation and the potential energy comprised by the optical fiber; or, also, coherent transmission processes involve electromagnetic interaction between electromagnetically intense quanta of electromagnetic radiation in the neutralized beam and electrically charged particles comprised in the optical fiber if a modulated beam of partly electromagnetically neutralized quanta of electromagnetic radiation is applied.

Then, receiver apparatus utilizes the transmitted neutralized beam by an appropriate process for communications reception. Wherein, for example, receiving apparatus utilizes the transmitted beam by one of the power utilizing processes which are described in the preferred embodiment which pertains to FIG. (12a) except that the data encoded in the power of the modulated neutralized beam is utilized by receiving apparatus for communications.

Still yet other preferred embodiments of the present invention each employ a method which is applied for transmitting power for use as a utility as described in the preferred embodiments which pertain to FIGS. (12a), (12b), (12c), and (12d), and is also applied for transmitting power in the form of data for wireline communications as described before in the preferred embodiments for wireline communications. In which case, in each such embodiment, the target utilizes the power of a transmitted modulated beam of electromagnetically neutralized radiation for power per se by, for example, one of the power utilizing processes which are described in the preferred embodiment which pertains to FIG. (12a), and also utilizes the data encoded in the same transmitted beam for communications by one of the receiving processes which are described in the preferred embodiment which pertains to FIG. (13), that is, for example, one of the power utilizing processes which are described in the preferred embodiment which pertains to FIG. (12a) except that the data encoded in the power of the transmitted neutralized beam is utilized by receiving apparatus for communications.

FIGS. (15) and (16) each illustrate a side view of a somewhat specific preferred embodiment of the present invention which is applied for transmitting data in an effective manner for wireless communications. The steps which are applied in the preferred embodiment which pertains to FIG. (13) for wireline communications, and the preferred embodiments for wireline communications which specifically include the application of relatively long wavelengths of electromagnetically neutralized quanta of electromagnetic radiation relative to optical wavelengths (which are referred to immediately following the preferred embodiment pertaining to FIG. (14', and which are pertinent to the preferred embodiment which pertains to FIG. 13), are, in general, applicable in the preferred embodiment for wireless communications which is illustrated in FIG. (15), except with respective modifications including the application of air (6dh) as a coherent transmission medium instead of air filled tubing. While, the methods which apply wave division multiplexing and demultiplexing for wireline communications as described in the preferred embodiments which pertain to FIGS. (14), (14'), and as referred to in the preferred embodiments which specifically include the application of relatively long wavelengths of electromagnetically neutralized quanta of electromagnetic radiation relative to optical wavelengths (which are referred to immediately following the preferred embodiment pertaining to FIG. 14', and which are pertinent to the preferred embodiment which pertains to FIG. 14), are, in general, applicable in the preferred embodiment for wireless communications which is illustrated in FIG. (16), except with respective modifications including the application of air (6dk) as a coherent transmission medium instead of air filled tubing.

Wherein, in both preferred embodiments (15) and (16), the adverse electromagnetic interaction of a respectively applied modulated neutralized beam with electrically charged particles comprised in air is eliminated in direct proportion to the time-averaged energy flux density which is eliminated from the respective coherently transmitted neutralized beam during transmission. In which case, the adverse electromagnetic effects of transmitting energy for wireless communications are eliminated to a directly proportional extent, e.g., adverse electromagnetic-based scattering, e.g., Rayleigh scattering, adverse electromagnetic-based absorption, and corresponding adverse electromagnetic-based signal attenuation of the neutralized beam are eliminated in direct proportion to the time-averaged energy flux density which is eliminated from the respectively applied beam of electromagnetically neutralized quanta of electromagnetic radiation during transmission so as to increase the distance a signal can travel without being amplified (or repeated), such that the need for relatively high transmitter power output and/or the need for signal amplification (or repeating) is eliminated to a directly proportional extent, and such that the bandwidth (in terms of frequencies) which is available (for practical purposes) for signal transmission is increased.

To broaden, the detailed description of the present invention herein describes a limited number of the embodiments of the present invention. Yet, various other embodiments of the present invention can be included in the scope of the present invention. Thus, the present invention should be interpreted in as broad a scope as possible so as to include all of the equivalent embodiments of the present invention.

Notes: Reference characters (2), (4), (6), and (8) in the present patent disclosure each represent a parent part comprising the full scope of the group of parts which each have a reference character with the same number and a lower case letter (or letters) following the number, and each of those reference characters which is different from, but related to, the parent part reference character represents a somewhat different scope (or selection) of the full set of versions of the parent part; Drawing, including drawing illustrating a beam of electromagnetically neutralized radiation, which is positioned inside other drawing is not illustrated as hidden, and thus, for example, a beam of electromagnetically neutralized radiation in such drawing is not represented by a dashed line. This is done in the case of a beam of electromagnetically neutralized radiation since the superposition resultant of a beam which is produced by total destructive interference of forward traveling transverse waves, and total cancellation of associated electromagnetic fields, can be represented conventionally by a dashed line as illustrated in FIG. (2-a); Hatching which is applied to sectional views is somewhat generic in that it is not intended to represent any particular material, but rather it is intended to represent a range of materials relevant to the particular application; Thick dashed lines adjacent to hatched tubing is intended to indicated that the tubing extends farther than illustrated; Note that the drawings are not drawn to scale, such that, for example, the transmitter and receiver in FIGS. (15) and (16) may be separated farther than illustrated; The term "eliminate," and each of the various forms thereof (including "eliminates," "eliminated," "eliminating," and "elimination"), means to "omit" in its respective form in the various forms of the phrases which relate to the elimination of time-averaged energy flux density from an electromagnetically neutralized beam, the elimination of adverse electromagnetic interaction, the elimination of adverse electromagnetic effects, and any similar phrase; The term "time-averaged energy flux density" means "intensity"; The unqualified term "electrically charged particle" means "an electromagnetically intense electrically charged particle" (as pertains to the definition of an electromagnetically intense entity referred to in the preferred embodiment which pertains to FIG. 1), and, similarly, the unqualified term "electrically charged particles" such as in the parenthetical phrase "(e.g., electrically charged particles)" means "electromagnetically intense electrically charged particles"; The phrase "at least one transducible change in momentum" means "at least one change in momentum which is capable of being transduced"; The term "total destructive interference" should be considered as the maximum amount of destructive interference possible with respect to an electromagnetically neutralized beam of radiation, in which case an electromagnetically neutralized beam of radiation which is produced with total destructive interference is considered to comprise an electromagnetically neutralized coherent beam of superimposed quasi-monochromatic waves which are associated with quasi-monoenergetic quanta of electromagnetic radiation, or is considered to comprise an electromagnetically neutralized coherent beam of superimposed quasi-monochromatic waves which are associated with quasi-monoenergetic propagating electrically charged particles. Wherein, all other related references such as a "superposition resultant of zero magnitude"; "resultant electromagnetic field of zero magnitude"; "time-averaged energy flux density of zero magnitude"; words to the effect of "the total electromagnetic neutralization of a beam"; "total electric charge neutralization"; "totally electromagnetically neutralized radiation"; words to the effect of "the total elimination of time-averaged energy flux density from a beam"; words to the effect of "the total elimination of the adverse electromagnetic interaction of a neutralized beam with electrically charged particles in a coherent transmission medium"; and words to the effect of "the total elimination of the adverse electromagnetic effects of transmitting energy"; should be considered as approximations which establish relative starting "zero" references accordingly. Wherein, for example, an applied beam of totally electromagnetically neutralized radiation would "minimally" electromagnetically interact with electrically charged particles comprised in transmission apparatus during coherent transmission; References to the amount of electromagnetic intensity comprised by a beam (or radiation comprised in a beam) pertain to the conditions of the waves which are associated with, and electromagnetic fields which are produced by, the beam. Wherein, for example, the term "partly electromagnetically intense" (or the like) with respect to a uniform beam of partly electromagnetically neutralized radiation pertains to the condition of the beam of partly neutralized radiation in that it comprises coherent radiation with associated superimposed forward traveling waves which not only partly destructively interfere, but also partly constructively interfere; and in that it produces electromagnetic fields, which are associated with the waves, which not only partly cancel, but also partly reinforce. In which case, the beam of partly electromagnetically neutralized radiation is "partly electromagnetically intense" (i.e., comprises a partial intensity or a partial time-averaged energy flux density) relative to the maximum possible intensity comprised by a hypothetical beam of totally electromagnetically intense radiation which would be equivalent except that it would be produced with total constructive interference of respectively associated waves, and total reinforcement of the respectively associated electromagnetic fields which are produced by the hypothetical beam; or the beam of partly electromagnetically neutralized radiation is "partly electromagnetically intense" relative to the maximum possible intensity comprised by a hypothetical beam of totally electromagnetically intense radiation which would be equivalent except that it would be produced with total spatial incoherence. Wherein, it is considered that a uniform beam such as beam (4b) (which is illustrated in FIG. (2-a), or beam (4h) (which is illustrated in FIG. 3-a) (or radiation comprised in such a uniform beam) is electromagnetically intense relative to the maximum and minimum (i.e., "zero") possible intensities of the beam of which it is comprised as relates to such hypothetical beams; Any reference to the adverse electromagnetic interaction (or the elimination thereof) of a coherently transmitted beam of electromagnetically neutralized radiation with electrically charged particles comprised in a coherent transmission apparatus is based on a coherently transmitted beam of electromagnetically neutralized radiation comprising a significantly large quantity of electromagnetically neutralized radiation en masse in quantum mechanical terms, is based on a coherently transmitted beam of electromagnetically neutralized radiation comprising a significantly large quantity of electromagnetically neutralized radiation over an extended interval of time in quantum mechanical terms, or is based on any quantity of electromagnetically neutralized radiation which is coherently transmitted through a quantum mechanically significant length of electrically charged particles; Coherence length should be considered with respect to the maintenance and elimination of destructive interference of forward traveling waves, and the maintenance and elimination of the cancellation of respectively associated electromagnetic fields, which pertain to a beam of electromagnetically neutralized radiation which is applied in the present invention; Certain beams of radiation (e.g., one or more beams of radiation which are created by, for example, backscattering, backreflections, multiple reflections, e.g., secondary reflections, or extraneous beams) in any given embodiment in the specification herein may not be illustrated and/or may not be referred to in some way or ways so that any such embodiment of the present invention is not too confusing; Certain phrases in the present patent disclosure pertaining to transmitting energy in an effective manner including phrases such as "in order to accomplish their overall objectives in an effective manner"; "for producing an overall effective result"; "the transmission and subsequent utilization of energy in an effective manner"; or "such that a result is produced in an overall effective manner" each mean to include the objective of transmitting energy in order to accomplish a particular result, and also mean to include the objective of doing so in an efficient manner (i.e., doing so without an applied beam of electromagnetically neutralized radiation adversely electromagnetically interacting with electrically charged particles comprised in a coherent transmission medium to an extent, and without related adverse electromagnetic effects to a directly proportional extent).

I claim:
1. A method of transmitting electromagnetically neutralized radiation for transmitting energy in an energy efficient manner, wherein the method comprises the following steps of:
  1) generating a generic beam of electromagnetically neutralized radiation with apparatus comprising interferometric apparatus such as a Mach-Zehnder interferometer, wherein the interferometric apparatus produces at least two beams of intense coherent radiation and then combines the intense coherent beams with a beam combiner in order to produce the neutralized beam comprising a totally electromagnetically neutralized beam or a partly electromagnetically neutralized beam, such that the coherent beams in the neutralized beam have associated coherent forward traveling waves which are superimposed and relatively aligned an amount out of phase selected from the group comprising 180 degrees out of phase and an amount out of phase which is within an open interval between zero degrees out of phase and 180 degrees out of phase, wherein the radiation in the neutralized beam comprises forward propagating radiation which is at least one selected from the group comprising forward propagating photons and forward propagating electrically charged particles, and wherein the waves which are associated with the neutralized beam comprise displacement vectors which cancel in direct proportion to the amount to which the waves are out of phase, such that the displacement vectors produce interference comprising total destructive interference or partial destructive interference corresponding to the amount to which the displacement vectors cancel, and such that the interference of the displacement vectors produces associated electric and magnetic field resultants which produce an intensity which is inversely proportional to the amount of the destructive interference, wherein the totally electromagnetically neutralized beam has associated waves which result in total destructive interference, such that the totally electromagnetically neutralized beam is associated with zero intensity, and wherein the partly electromagnetically neutralized beam has associated waves which result in partial destructive interference, such that the partly electromagnetically neutralized beam is associated with non-zero intensity;
  2) coherently transmitting the radiation in the neutralized beam through a generic transmission medium comprising electrically charged particles to a transducer, wherein the generating apparatus is adjoining the transmission medium, and wherein the transmission medium comprises one selected from the group comprising air filled tubing, optical fiber, and air comprising at least one selected from the group comprising atoms and molecules, wherein as the neutralized beam is transmitted through the transmission medium the interaction of the radiation in the neutralized beam with the electrically charged particles comprised in the transmission medium by manner of electromagnetic force is eliminated by an amount which is directly proportional to the amount of the destructive interference in the neutralized beam and inversely proportional to the intensity of the resultant electromagnetic field which remains in the neutralized beam, wherein the totally electromagnetically neutralized beam produces zero electromagnetic interaction with the electrically charged particles comprised in the transmission medium, and wherein the partly electromagnetically neutralized beam produces non-zero electromagnetic interaction with the electrically charged particles comprised in the transmission medium, such that the partly neutralized beam of photons is attenuated by the transmission medium by the respectively remaining non-zero electromagnetic interaction by an attenuation process comprising at least one selected from the group which first comprises an electromagnetic-based attenuation process in which the generic transmission medium is a first more specific transmission medium comprising at least one selected from the group comprising atoms and molecules in which the first transmission medium absorbs a non-zero amount of energy out of the partly neutralized beam of forward propagating photons in direct proportion to the remaining non-zero intensity of the respective partly electromagnetically neutralized beam of photons such as by a manner in which the absorbed energy is transformed into a portion of the thermal energy of the first transmission medium and second comprises an electromagnetic-based attenuation process in which the generic transmission medium is a second more specific transmission medium comprising at least one selected from the group comprising atoms and molecules in which the partly neutralized beam of photons is attenuated by a process in which a quantity of the photons from the partly neutralized beam of photons is absorbed and reradiated by the second transmission medium out of the partly neutralized beam of forward propagating photons in direct proportion to the remaining non-zero intensity of the respective partly electromagnetically neutralized beam of photons such as by manner of Rayleigh scattering for the case in which the respective partly neutralized beam of photons more specifically comprises optical wavelength electromagnetic radiation and the transmission medium comprises the air filled tubing, the optical fiber, or the air, and such that the partly neutralized beam of electrically charged particles is attenuated by the generic transmission medium by the respectively remaining non-zero electromagnetic interaction by an attenuation process which comprises at least one Coulomb force based collision process selected from the group which first comprises a process in which a quantity of the electrically charged particles from the partly neutralized beam of electrically charged particles collides with a quantity of the electrically charged particles comprised in the generic transmission medium in direct proportion to the remaining non-zero intensity of the respective partly electromagnetically neutralized beam of electrically charged particles such as by manner of elastic or inelastic scattering such that each of the respectively rebounding electrically charged particles is redirected out of the respective partly neutralized beam of forward propagating electrically charged particles and second comprises a process in which a quantity of the electrically charged particles from the partly neutralized beam of electrically charged particles collides with a quantity of the electrically charged particles comprised in the generic transmission medium in direct proportion to the remaining non-zero intensity of the respective partly electromagnetically neutralized beam of electrically charged particles such as by manner of inelastic collision such that each of the respectively rebounding electrically charged particles is consequentially associated with a longer wavelength and is propagating in the forward direction within the perimeter of the respective partly neutralized beam of forward propagating electrically charged particles, wherein the electromagnetic interaction of the generic neutralized beam with the generic transmission medium is controlled by the intensity of the generic neutralized beam in a directly proportional manner, and wherein the amount of the energy in the generic neutralized beam which is transmitted to the transducer is controlled by the intensity of the generic neutralized beam in an inversely proportional manner; and 3) transferring an amount of the energy from the transmitted generic beam of electromagnetically neutralized radiation to the transducer, wherein the generic transmission medium is adjoining the transducer, and wherein an amount of the energy which is transferred to the transducer is transduced by the transducer into a result comprising at least one selected from the group of electrical voltage and electrical current.

2. The method of claim 1, more specifically in which the magnitude of the momentum in the generic neutralized beam is modulated with a modulator so that the generic neutralized beam comprises at least one change in the magnitude of the momentum, wherein the generic neutralized beam is modulated by changes in the modulator which affect the momentum of the generic neutralized beam as the generic neutralized beam is transmitted through the modulator such as modulated by changes in the refractive index property of an acousto-optic modulator for the case in which the generic neutralized beam more specifically comprises optical electromagnetic radiation which operates with the acousto-optic modulator, and more specifically in which the transducer is a pressure transducer, wherein the transmitted generic neutralized beam applies pressure upon the pressure transducer according to the modulation of the momentum of the transmitted generic neutralized beam, such that at least one change in pressure is applied by the generic neutralized beam upon the pressure transducer so that the pressure transducer produces the result, wherein the result more specifically comprises at least one change in the output of the pressure transducer comprising at least one selected from the group of electrical voltage output and electrical current output.

3. The method of claim 1, more specifically in which the generic neutralized beam of electromagnetically neutralized radiation is partly electromagnetically neutralized, wherein the partly electromagnetically neutralized beam has associated waves which produce partial destructive interference and partial constructive interference, such that the associated electric and magnetic fields each cancel in direct proportion to the amount of the destructive interference and each reinforce in direct proportion to the amount of the constructive interference, wherein the resultant electromagnetic field of the partly electromagnetically neutralized beam has non-zero intensity which is inversely proportional to the amount of the destructive interference and directly proportional to the amount of the constructive interference, and more specifically in which the transducer is a detector comprising electrically charged particles, wherein the energy which is transferred from the transmitted beam of partly electromagnetically neutralized radiation to the detector is more specifically transferred to electrically charged particles comprised in the detector by manner of electromagnetic force so that the detector produces the result.

4. A method of transmitting electromagnetically neutralized radiation for transmitting energy in an energy efficient manner, wherein the method comprises the following steps of:

1) generating a generic beam of electromagnetically neutralized radiation with apparatus comprising interferometric apparatus such as a Mach-Zehnder interferometer, wherein the interferometric apparatus produces at least two beams of intense coherent radiation and then combines the intense coherent beams with a beam combiner in order to produce the neutralized beam comprising a totally electromagnetically neutralized beam or a partly electromagnetically neutralized beam, such that the coherent beams in the neutralized beam have associated coherent forward traveling waves which are superimposed and relatively aligned an amount out of phase selected from the group comprising 180 degrees out of phase and an amount out of phase which is within an open interval between zero degrees out of phase and 180 degrees out of phase, wherein the radiation in the neutralized beam comprises forward propagating radiation which is at least one selected from the group comprising forward propagating photons and forward propagating electrically charged particles, and wherein the waves which are associated with the neutralized beam comprise displacement vectors which cancel in direct proportion to the amount to which the waves are out of phase, such that the displacement vectors produce interference comprising total destructive interference or partial destructive interference corresponding to the amount to which the displacement vectors cancel, and such that the interference of the displacement vectors produces associated electric and magnetic field resultants which produce an intensity which is inversely proportional to the amount of the destructive interference, wherein the totally electromagnetically neutralized beam has associated waves which result in total destructive interference, such that the totally electromagnetically neutralized beam is associated with zero intensity, and wherein the partly electromagnetically neutralized beam has associated waves which result in partial destructive interference, such that the partly electromagnetically neutralized beam is associated with non-zero intensity;

2) coherently transmitting the radiation in the neutralized beam through a generic transmission medium comprising electrically charged particles to a transducer, wherein the generating apparatus is adjoining the transmission medium, and wherein the transmission medium comprises one selected from the group comprising air filled tubing, optical fiber, and air comprising at least one selected from the group comprising atoms and molecules, wherein as the neutralized beam is transmitted through the transmission medium the interaction of the radiation in the neutralized beam with the electrically charged particles comprised in the transmission medium by manner of electromagnetic force is eliminated by an amount which is directly proportional to the amount of the destructive interference in the neutralized beam and inversely proportional to the intensity of the resultant electromagnetic field which remains in the neutralized beam, wherein the totally electromagnetically neutralized beam produces zero electromagnetic interaction with the electrically charged particles comprised in the transmission medium, and wherein the partly electromagnetically neutralized beam produces non-zero electromagnetic interaction with the electrically charged particles comprised in the transmission medium, such that the partly neutralized beam of photons is attenuated by the transmission medium by the respectively remaining non-zero electromagnetic interaction by an attenuation process comprising at least one selected from the group which first comprises an electromagnetic-based attenuation process in which the generic transmission medium is a first more specific transmission medium comprising at least one selected from the group comprising atoms and molecules in which the first transmission medium absorbs a non-zero amount of energy out of the partly neutralized beam of forward propagating photons in direct proportion to the remaining non-zero intensity of the respective partly electromagnetically neutralized beam of photons such as by a manner in which the absorbed energy is transformed into a portion of the thermal energy of the first transmission medium and second comprises an electromagnetic-based attenuation process in which the generic transmission medium is a second more specific transmission medium comprising at least one selected from the group comprising atoms and molecules in which the partly neutralized beam of photons is attenuated by a process in which a quantity of the photons from the partly neutralized beam of photons is absorbed and reradiated by the second transmission medium out of the partly neutralized beam of forward propagating photons in direct proportion to the remaining non-zero intensity of the respective partly electromagnetically neutralized beam of photons such as by manner of Rayleigh scattering for the case in which the respective partly neutralized beam of photons more specifically comprises optical wavelength electromagnetic radiation and the transmission medium comprises the air filled tubing, the optical fiber, or the air, and such that the partly neutralized beam of electrically charged particles is attenuated by the generic transmission medium by the respectively remaining non-zero electromagnetic interaction by an attenuation process which comprises at least one Coulomb force based collision process selected from the group which first comprises a process in which a quantity of the electrically charged particles from the partly neutralized beam of electrically charged particles collides with a quantity of the electrically charged particles comprised in the generic transmission medium in direct proportion to the remaining non-zero intensity of the respective partly electromagnetically neutralized beam of electrically charged particles such as by manner of elastic or inelastic scattering such that each of the respectively rebounding electrically charged particles is redirected out of the respective partly neutralized beam of forward propagating electrically charged particles and second comprises a process in which a quantity of the electrically charged particles from the partly neutralized beam of electrically charged particles collides with a quantity of the electrically charged particles comprised in the generic transmission medium in direct proportion to the remaining non-zero intensity of the respective partly electromagnetically neutralized beam of electrically charged particles such as by manner of inelastic collision such that each of the respectively rebounding electrically charged particles is consequentially associated with a longer wavelength and is propagating in the forward direction within the perimeter of the respective partly neutralized beam of forward propagating electrically charged particles, wherein the electromagnetic interaction of the generic neutralized beam with the generic transmission medium is controlled by the intensity of the generic neutralized beam in a directly proportional manner, and wherein the amount of the energy in the generic neutralized beam which is transmitted to the transducer is controlled by the intensity of the generic neutralized beam in an inversely proportional manner;

3) incoherently scattering an amount of the transmitted generic neutralized beam with scattering apparatus comprised in the transducer in order to produce a resulting beam comprising incoherent radiation which produces intensity, wherein the generic transmission medium is adjoining the transducer, and wherein the amount of incoherent radiation and the corresponding intensity which is produced in the resultant beam comprising incoherent radiation is directly proportional to the amount of the scattering of the transmitted generic neutralized beam; and 4) transferring an amount of the energy from the resultant beam to electrically charged particles comprised in the transducer by manner of electromagnetic force, wherein an amount of the energy which is transferred to the transducer is transduced by the transducer into a result comprising at least one selected from the group of electrical voltage and electrical current.

\* \* \* \* \*